US012715126B2

(12) United States Patent
Ogawa et al.

(10) Patent No.: US 12,715,126 B2
(45) Date of Patent: Aug. 25, 2026

(54) DETERMINATION DEVICE, DETERMINATION METHOD, AND STORAGE MEDIUM

(71) Applicant: NEC Corporation, Tokyo (JP)

(72) Inventors: Masatsugu Ogawa, Tokyo (JP); Nobuharu Kami, Tokyo (JP); Hisaya Wakayama, Tokyo (JP); Hiroyuki Oyama, Tokyo (JP); Masumi Ichien, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 18/023,812

(22) PCT Filed: Sep. 7, 2020

(86) PCT No.: PCT/JP2020/033735

§ 371 (c)(1),
(2) Date: Feb. 28, 2023

(87) PCT Pub. No.: WO2022/049756

PCT Pub. Date: Mar. 10, 2022

(65) Prior Publication Data

US 2023/0321827 A1 Oct. 12, 2023

(51) Int. Cl.
*B25J 9/16* (2006.01)
*G06F 9/52* (2006.01)

(52) U.S. Cl.
CPC .............. *B25J 9/1656* (2013.01); *G06F 9/52* (2013.01)

(58) Field of Classification Search
CPC ......... B25J 9/1656; B25J 9/1674; G06F 9/52; G05B 2219/34372
See application file for complete search history.

(56) References Cited

U.S. PATENT DOCUMENTS

2006/0276934 A1* 12/2006 Nihei ..................... B25J 9/1679 700/245
2018/0029236 A1 2/2018 Stoia et al.
2018/0085922 A1 3/2018 Ooba
2018/0281190 A1 10/2018 Kakisaka et al.
(Continued)

FOREIGN PATENT DOCUMENTS

JP 2016-198861 A 12/2016
JP 2018-051684 A 4/2018
(Continued)

OTHER PUBLICATIONS

Extended European Search Report for EP Application No. 20952490.9, dated on Oct. 5, 2023.
(Continued)

*Primary Examiner* — Basil T. Jos
(74) *Attorney, Agent, or Firm* — Sughrue MIon, PLLC

(57) ABSTRACT

A determination device 1X mainly includes a proposition determination means 18X. The proposition determination means 18X performs a completion determination of a task based on a first proposition representing a current state of the task and a second proposition representing a completion state of the task, in which the first proposition and the second proposition are detected by a sensor, when an operation sequence concerning the task has completed or when a predetermined time length has lapsed from a start of the task.

15 Claims, 14 Drawing Sheets

100: ROBOT CONTROL SYSTEM

(56) References Cited

U.S. PATENT DOCUMENTS

| | | | | |
|---|---|---|---|---|
| 2018/0326584 | A1* | 11/2018 | Wang | B25J 9/1664 |
| 2019/0143524 | A1 | 5/2019 | Takahashi et al. | |
| 2019/0232493 | A1* | 8/2019 | Takeuchi | B25J 9/161 |
| 2019/0337150 | A1 | 11/2019 | Parikh et al. | |
| 2019/0351542 | A1 | 11/2019 | Buerger et al. | |
| 2020/0012670 | A1 | 1/2020 | Heckmann et al. | |
| 2020/0276699 | A1* | 9/2020 | Buerger | B25J 9/1664 |
| 2022/0355475 | A1* | 11/2022 | Oyama | B25J 9/1661 |

FOREIGN PATENT DOCUMENTS

| | | | |
|---|---|---|---|
| JP | 2018-167361 | A | 11/2018 |
| JP | 2019-084664 | A | 6/2019 |
| JP | 2019-126895 | A | 8/2019 |
| JP | 2019-200792 | A | 11/2019 |

OTHER PUBLICATIONS

Meng Guo et al., "Human-in-the-Loop Mixed-Initiative Control Under Temporal Tasks", 2018 IEEE International Conference on Robotics and Automation (ICRA), IEEE, May 21, 2018, pp. 6395-6400, XP033403288, <DOI: 10.1109/ICRA.2018.8460793> [retrieved on Sep. 10, 2018].

International Search Report for PCT Application No. PCT/JP2020/033735, mailed on Dec. 8, 2020.

* cited by examiner

START

S11 ACQUIRE TASK INSTRUCTION INFORMATION

S12 GENERATE OPERATION SEQUENCE

S13 ROBOT CONTROL BASED ON OPERATION SEQUENCE

S14 IS OPERATION SEQUENCE COMPLETED?

No

Yes

S15 GENERATE FIRST PROPOSITION REPRESENTING CURRENT STATE AND SECOND PROPOSITION REPRESENTING GOAL STATE

S16 MATCH WITH EACH OTHER?

No

Yes

S17 NOTIFY TASK COMPLETION

S18 OUTPUT ALERT INFORMATION

END

DETERMINATION DEVICE, DETERMINATION METHOD, AND STORAGE MEDIUM

This application is a National Stage Entry of PCT/JP2020/033735 filed on Sep. 7, 2020, the contents of all of which are incorporated herein by reference, in their entirety.

TECHNICAL FIELD

The present disclosure relates to a technical field of a determination device, a determination method, and a storage medium for performing processing related to tasks to be executed by a robot.

BACKGROUND ART

There is proposed such a control method to perform control of a robot necessary for executing a task when the task to be performed by a robot is given. For example, Patent Literature 1 discloses a robot controller configured, when placing a plurality of objects in a container by a robot with a hand for gripping an object, to determine possible orders of gripping the objects by the hand and to determine an order of the objects to be placed in the container based on an index calculated with respect to each of the possible orders. Moreover, Patent Literature 2, in a case of moving an object (workpiece) by a robot hand, a robot system for notifying an end of a process to a user is disclosed.

PRECEDING TECHNICAL REFERENCES

Patent Document

Patent Document 1: Japanese Laid-open Patent Publication No. 2018-051684

Patent Document 2: Japanese Laid-open Patent Publication No. 2016-198861

SUMMARY

Problem to be Solved by the Invention

In a case of performing a completion determination as to whether or not a robot has normally completed a task, in order to accurately perform the completion determination, it is necessary to perform a complicated process based on an output of a sensor for the task completion determination, and it has been necessary to prepare a scheme for the task completion determination for each task.

It is one object of the present disclosure to provide a determination device, a determination method, and a recording medium that are capable of preferably performing the completion determination for each task to be executed by the robot.

Means for Solving the Problem

According to an example aspect of the present disclosure, there is provided a determination device including a proposition determination means configured to perform a completion determination of a task based on a first proposition representing a current state of the task and a second proposition representing a completion state of the task, in which the first proposition and the second proposition are detected by a sensor, when an operation sequence concerning the task has completed or when a predetermined time length has lapsed from a start of the task.

According to another example aspect of the present disclosure, there is provided a determination method performed by a computer, the determination method including performing a completion determination of a task based on a first proposition representing a current state of the task and a second proposition representing a completion state of the task, in which the first proposition and the second proposition are detected by a sensor, when an operation sequence concerning the task has completed or when a predetermined time length has lapsed from a start of the task.

According to a further example aspect of the present disclosure, there is provided a recording medium storing a program, the program causing a computer to perform a process including performing a completion determination of a task based on a first proposition representing a current state of the task and a second proposition representing a completion state of the task, in which the first proposition and the second proposition are detected by a sensor, when an operation sequence concerning the task has completed or when a predetermined time length has lapsed from a start of the task.

Effect of the Invention

It is possible to preferably execute a completion determination of a task to be executed by a robot.

EXAMPLE EMBODIMENTS

In the following, example embodiments concerning a determination device, a determination method, and a recording medium will be described with reference to the accompanying drawings.

First Example Embodiment (1) System Configuration

Figure 1:
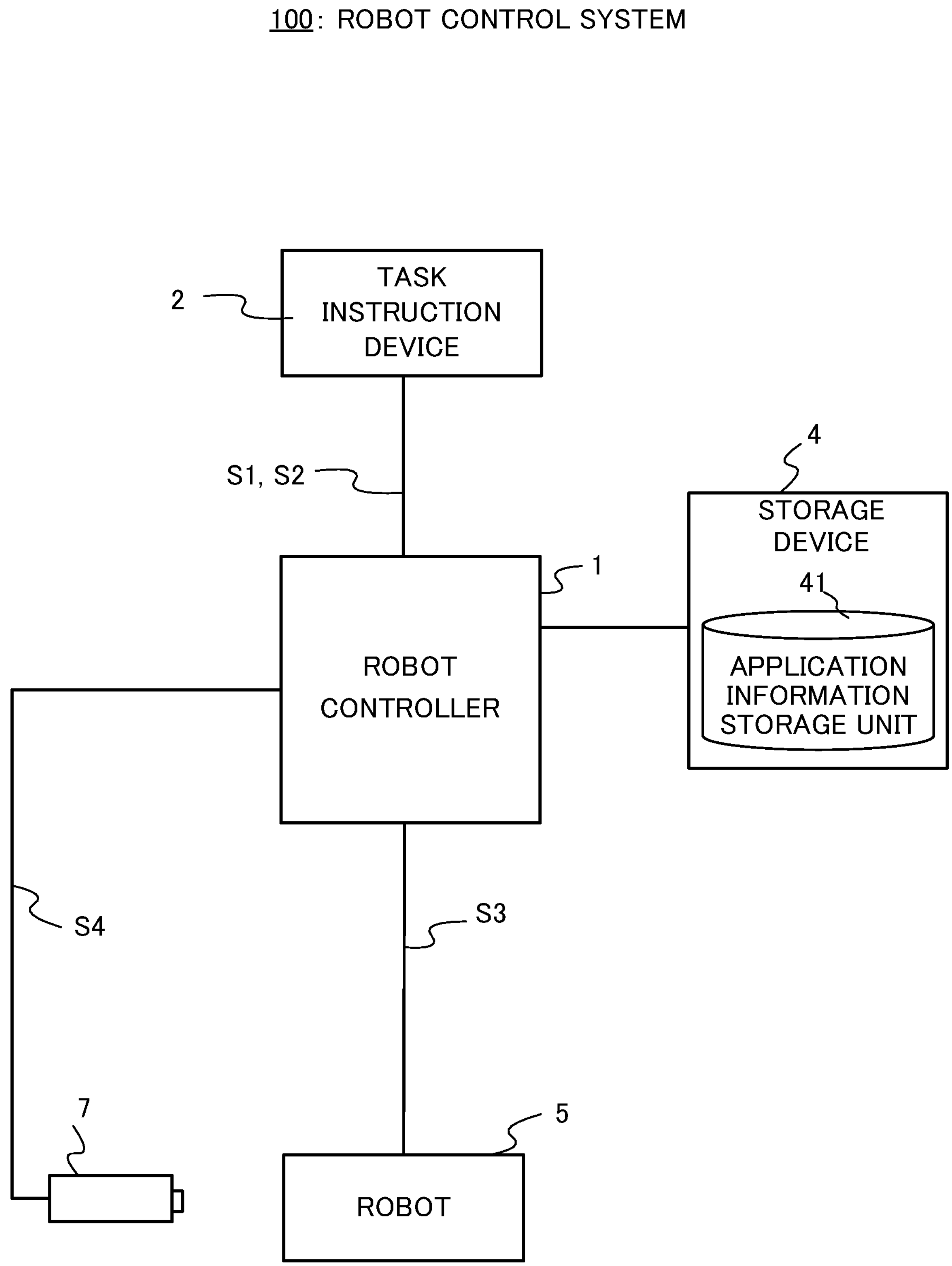
FIG. 1 illustrates an overall configuration of a robot control system in a first example embodiment.

FIG. 1 illustrates a configuration of a robot control system 100 according to a first example embodiment. The robot control system 100 mainly includes a robot controller 1, a task instruction device 2, a storage device 4, a robot 5, and a measurement device 7.

When a task (also referred to as "objective task") to be performed by the robot 5 is specified, the robot controller 1 converts the objective task into a time step sequence of simple tasks each of which the robot 5 can accept, and controls the robot 5 based on the sequence. Hereafter, a simple task in units of command that can be accepted by the robot 5 is also referred to as "subtask" and a sequence of subtasks to be executed by each of the robots 5 in order to achieve the objective task is referred to as "subtask sequence". The subtask sequence corresponds to an operation (motion) sequence which defines a series of operations to be executed by the robot 5.

Moreover, the robot controller 1 performs data communications with the task instruction device 2, the storage device 4, the robot 5, and the measurement device 7 through a communication network or directly through a wireless or wired communication. For instance, the robot controller 1 receives an input signal "S1" specifying the objective task from the task instruction device 2. In addition, the robot controller 1 transmits an output control signal "S2" for causing the task instruction device 2 to output information related to the task to be executed by the robot 5, to the task instruction device 2. Furthermore, the robot controller 1 transmits a control signal "S3" related to a control of the robot 5, to the robot 5. Also, the robot controller 1 receives a measurement signal "S4" from the measurement device 7.

The task instruction device 2 is a device that accepts an input regarding the objective task by a worker who designates the objective task. The task instruction device 2 displays information based on the output control signal S2 supplied from the robot controller 1, or supplies the input signal S1 generated based on the input from the worker to the robot controller 1. The task instruction device 2 may be a tablet terminal comprising an input unit and a display unit, or may be a stationary personal computer.

The storage device 4 includes an application information storage unit 41. The application information storage unit 41 stores application information necessary for generating the subtask sequence from the objective task. Details of the application information will be described later with reference to FIG. 3. The storage device 4 may be an external storage device such as a hard disk connected to or built in to the robot controller 1, or may be a recording medium such as a flash memory. The storage device 4 may be one or more server devices the perform data communications with the robot controller 1 via the communication network. In this case, the storage device 4 may be formed by a plurality of server devices.

The robot 5 performs a task concerning the objective task based on the control signal S3 supplied from the robot controller 1. The robot 5 corresponds to, for instance, a robot that operates in various factories such as an assembly factory and a food factory, or a logistics site. The robot 5 may be a vertical articulated robot, a horizontal articulated robot, or any other type of robot. The robot 5 may supply a state signal indicating a state of the robot 5 to the robot controller 1. The state signal may be an output signal from a sensor for detecting a state (such as a position, an angle, or the like) of the entire robot 5 or of specific portions such as joints of the robot 5, or may be a signa which is generated by a control unit of the robot 5 and indicates a progress of the subtasks to be executed by the robot 5.

The measurement device 7 is one or more sensors formed by a camera, a range sensor, a sonar, or a combination thereof to detect a state in a workspace in which an objective task is performed. In the present example embodiment, the measurement device 7 is assumed to include at least one camera for imaging the workspace. The measurement device 7 supplies the generated measurement signal S4 to the robot controller 1. The measurement signal S4 includes at least an image capturing an inside the workspace. The measurement device 7 may be a self-propelled sensor or a flying sensor (including a drone) that moves within the workspace. Also, the measurement device 7 may include sensors provided on the robot 5, sensors provided on other objects in the workspace, and the like. The measurement device 7 may also include a sensor that detects sound in the workspace. As described above, the measurement device 7 may include various sensors to detect the state in the workspace and to be installed in arbitrary places.

Note that the configuration of the robot control system 100 illustrated in FIG. 1 is an example, and various changes may be made to the configuration. For instance, a plurality of the robots 5 may exist, and the robot 5 may be equipped with a plurality of control targets which operate independently such as robot arms. Even in these cases, the robot controller 1 generates the subtask sequence to be executed for each robot 5 or for each of the control targets based on the objective task, and transmits the control signal S3 to the target robot 5 based on the subtask sequence. Furthermore, the robot 5 may be one that performs a cooperative work with other robots, workers, or machine tools which operate in the workspace. The measurement device 7 may be a part of the robot 5. The task instruction device 2 may be configured as the same device as the robot controller 1. In addition, the robot controller 1 may be formed by a plurality of devices. In this case, the plurality of devices forming the robot controller 1 exchanges information necessary to execute a process assigned in advance among these devices. Moreover, the robot controller 1 and the robot 5 may be integrally formed.

(2) Hardware Configuration

Figure 2A:
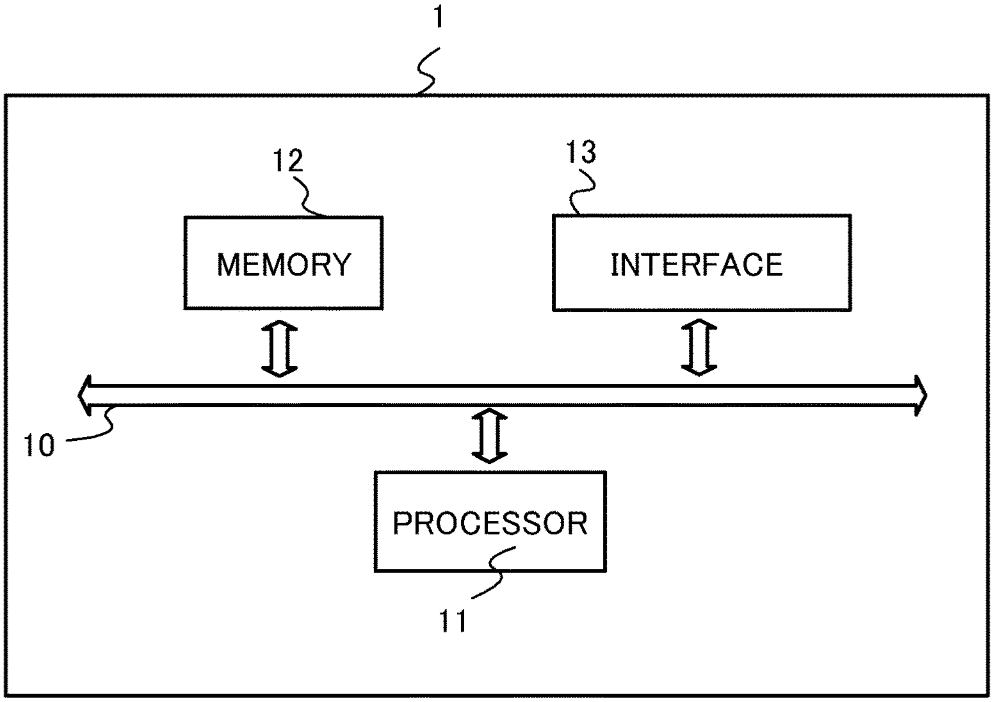
FIG. 2 is a diagram illustrating a hardware configuration of a robot controller.

FIG. 2A illustrates a hardware configuration of the robot controller 1. The robot controller 1 includes a processor 11, a memory 12, and an interface 13 as hardware. The processor 11, the memory 12, and the interface 13 are connected via a data bus 10.

The processor 11 functions as a controller (arithmetic unit) for performing an overall control of the robot controller 1 by executing programs stored in the memory 12. The processor 11 is, for instance, a CPU (Central Processing Unit), a GPU (Graphics Processing Unit), a TPU (Tensor Processing Unit) or the like. The processor 11 may be formed by a plurality of processors. The processor 11 is an example of a computer.

The memory 12 includes various volatile and non-transitory memories such as a RAM (Random Access Memory), a ROM (Read Only Memory), a flash memory, and the like. In addition, programs executed by the robot controller 1 are stored in the memory 12. A part of information stored in the memory 12 may be stored by one or a plurality of external storage devices capable of communicating with the robot controller 1, or may be stored in a recording medium detachable from the robot controller 1.

The interface 13 is an interface for electrically connecting the robot controller 1 and other devices. These interfaces may be wireless interfaces such as network adapters or the like for transmitting and receiving data to and from other devices wirelessly, or may be hardware interfaces for connecting the other devices by as cables or the like.

Note that the hardware configuration of the robot controller 1 is not limited to the configuration depicted in FIG. 2A. For instance, the robot controller 1 may be connected to or built in a display device, an input device, or at least one of the sound output device. The robot controller 1 may be configured to include at least one of the task instruction device 2 and the storage device 4.

Figure 2B:
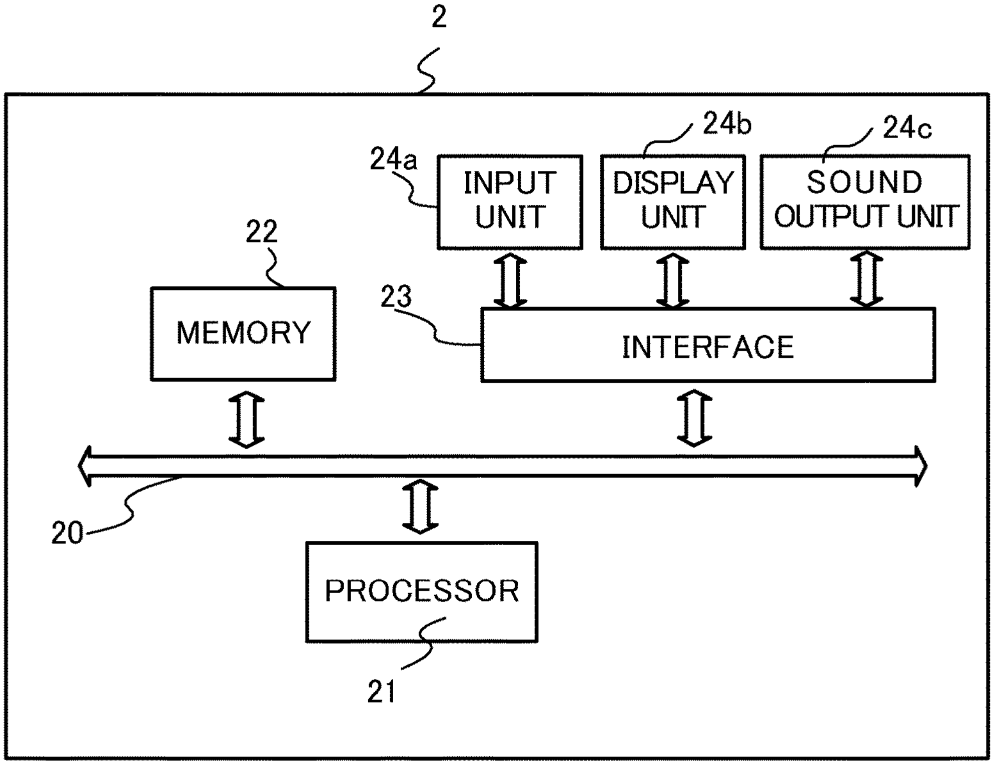

FIG. 2B illustrates a hardware configuration of the task instruction device 2. The task instruction device 2 includes, as hardware, a processor 21, a memory 22, an interface 23, an input unit 24*a*, a display unit 24*b*, and a sound output unit 24*c*. The processor 21, the memory 22 and the interface 23 are connected via a data bus 20. Moreover, the input unit 24*a*, the display unit 24*b*, the sound output unit 24*c*, are connected to the interface 23.

The processor 21 executes a predetermined process by executing a program stored in the memory 22. The processor 21 is a processor such as a CPU, a GPU, or the like. The processor 21 receives a signal generated by the input unit 24*a* via the interface 23, generates an input signal S1, and transmits the input signal S1 to the robot controller 1 via the interface 23. The processor 21 controls at least one of the display unit 24*b* and the sound output unit 24*c* via the interface 23 based on the output control signal S2 received from the robot controller 1.

The memory 22 is formed by various volatile and non-transitory memories such as a RAM, a ROM, the flash memory, and the like. Moreover, programs for executing processes executed by the task instruction device 2 are stored in the memory 22.

The interface 23 is an interface for electrically connecting the task instruction device 2 with other devices. These interfaces may be wireless interfaces such as network adapters or the like for transmitting and receiving data to and from other devices wirelessly, or may be hardware interfaces for connecting the other devices by as cables or the like. Moreover, the interface 23 performs interface operations of the input unit 24*a*, the display unit 24*b* and the sound output unit 24*c*. The input unit 24*a* is an interface that receives input from a user, and corresponds to, for instance, a touch panel, a button, a keyboard, and a voice input device. The display unit 24*b* corresponds to, for instance, a display, a projector, or the like, displays screens based on the control of the processor 21. The sound output unit 24*c* corresponds to, for instance, a speaker, and outputs sounds based on the control of the processor 21.

Note that the hardware configuration of the task instruction device 2 is not limited to the configuration depicted in FIG. 2B. For instance, at least one of the input unit 24*a*, the display unit 24*b*, and the sound output unit 24*c* may be configured as a separate device that electrically connects to the task instruction device 2. Moreover, the task instruction device 2 may be connected to various devices such as a camera and the like, and may incorporate them.

(3) Application Information

Next, a data structure of the application information stored in the application information storage unit 41 will be described.

Figure 3:
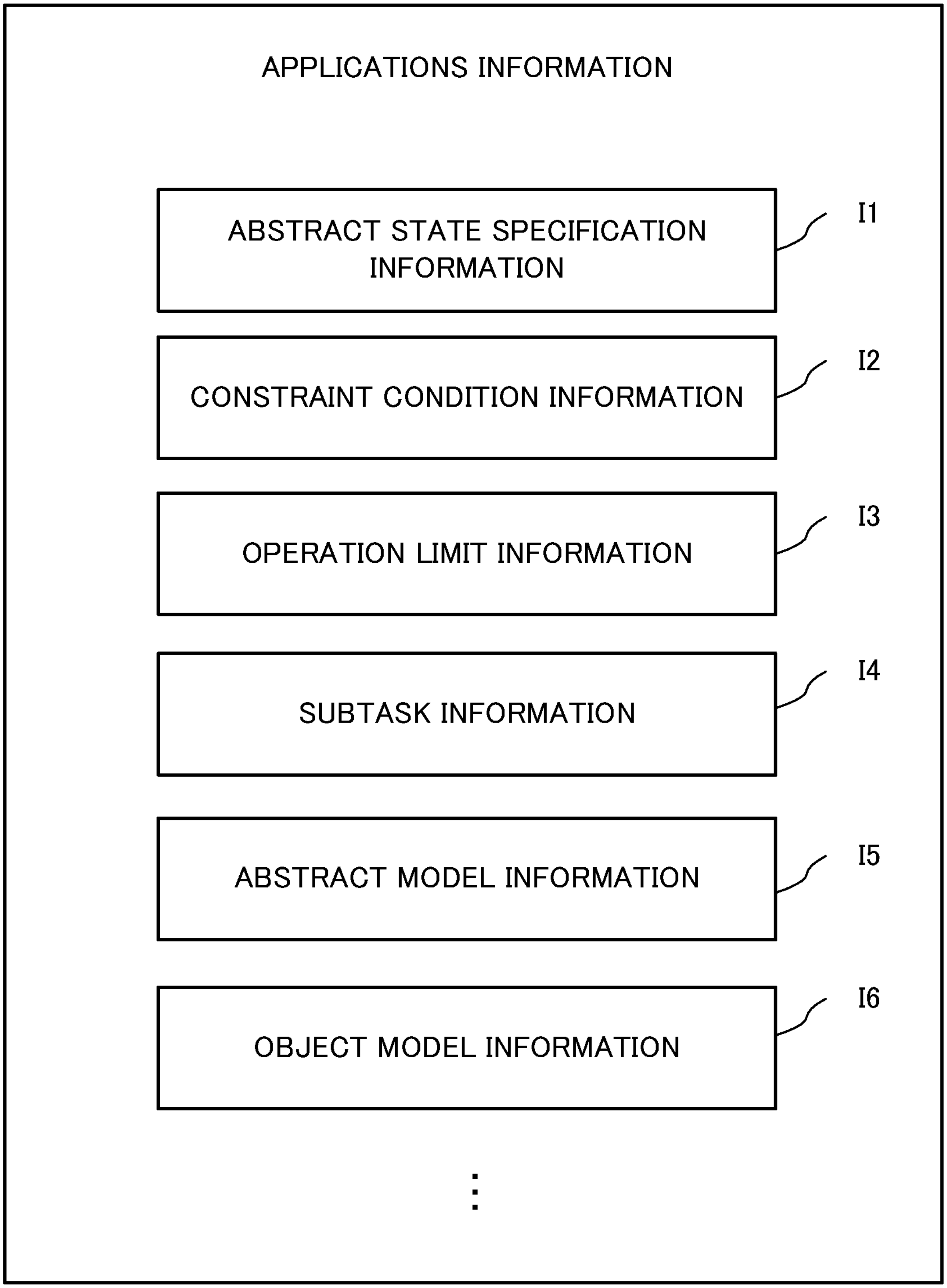
FIG. 3 illustrates an example of a data structure of application information.

FIG. 3 illustrates an example of a data structure of the application information stored in the application information storage unit 41. As illustrated in FIG. 3, the application information includes an abstract state designation information I1, a constraint condition information I2, an operation limit information I3, a subtask information I4, an abstract model information I5, and object model information I6.

The abstract state specification information I1 is information that designates an abstract state that needs to be defined when generating a subtask sequence. This abstract state abstractly represents a state of an object in the workspace, and is defined as a proposition to be used in a target logic formula which will be described later. For instance, the abstract state specification information I1 specifies the abstract state to be defined for each type of the objective task.

The constraint condition information I2 indicates a constraint condition for executing the objective task. The constraint condition information I2 indicates, for instance, a constraint condition that a contact from the robot (robot arm) to an obstacle is restricted, a constraint condition that a contact between the robots 5 (robot arms) is restricted, or other constraint conditions, in a case where the objective task is a pick-and-place. The constraint condition information I2 may be information in which appropriate constraint conditions are recorded for respective types of the objective tasks.

The operation limit information I3 indicates information concerning an operation limit of the robot 5 to be controlled by the robot controller 1. The operation limit information I3 is, for instance, information defining upper limits of a speed, an acceleration, and an angular velocity of the robot 5. It is noted that the operation limit information I3 may be information defining an operation limit for each movable portion or each joint of the robot 5.

The subtask information I4 indicates information on subtasks that the robot 5 can accept. For instance, in a case where the objective task is the pick-and-place, the subtask information I4 defines, as subtasks, a subtask "reaching" that is a movement of a robot arm of the robot 5, and a subtask "grasping" that is the grasping by the robot arm. The subtask information I4 may indicate information on subtasks that can be used for each type of the objective task.

The abstract model information I5 is information concerning an abstract model in which dynamics in the workspace are abstracted. For instance, an abstract model is represented by a model in which real dynamics are abstracted by a hybrid system, as will be described later. The abstract model information I5 includes information indicative of switching conditions of the dynamics in the above described hybrid system. For instance, in a case of the pick-and-place in which the robot 5 grasps an object being a target (called a "target object") and then places the object at a predetermined position, one of the switching conditions corresponds to that the target object is restricted to be moved unless the target object is gripped by the hand of the robot arm. The abstract model information I5 includes information concerning an abstract model suitable for each type of the objective task.

The object model information I6 is information concerning the object model of each object in the workspace to be recognized from the output signal S4 generated by the measurement device 7. Each of the above described objects corresponds to, for instance, one of the robot 5, an obstacle, a tool and any other target object handled by the robot 5, a working body other than the robot 5, and the like. The object model information I6 includes, for instance, information necessary for the control device 1 to recognize a type, a position, a posture, an operation being currently executed, and the like of each of the above described objects, and three dimensional shape information such as CAD (Computer Aided Design) data for recognizing a three dimensional shape of each object. The former information includes parameters of an inference engine obtained by learning a learning model that is used in a machine learning such as a neural network. For instance, when an image is input, the inference device is learned in advance so as to output the type, the position, and the posture of the object as a subject in the image.

In addition to the information described above, the application information storage unit 41 may store various types of information related to a generation process of the subtask sequence and a generation process of the output control signal S2.

(4) Process Overview

Next, a process of the robot controller 1 will be schematically described. Schematically, in response to a completion of the execution of the subtask sequence by the robot 5, the robot controller 1 performs a completion determination of the objective task based on a proposition that abstractly expresses a current state of the measured objective task and a proposition that abstractly expresses a completion state (goal) of an objective task being designated. After the execution of the subtask sequence is completed, the robot controller 1 outputs an alert (a warning) if the objective task has not reached the completion state.

Figure 4:
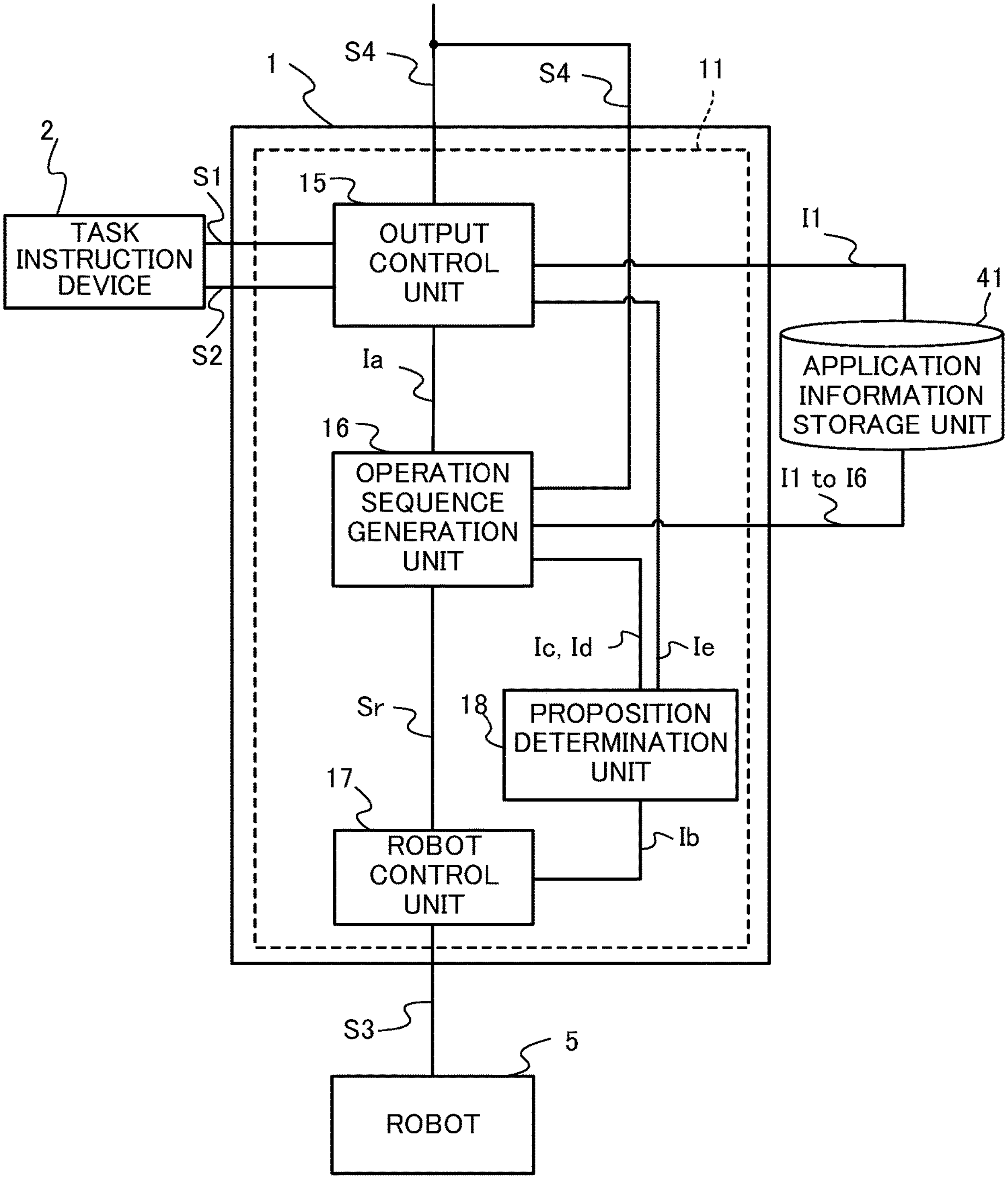
FIG. 4 illustrates an example of a functional block of the robot controller.

FIG. 4 is an example of a functional block illustrating an overview of the process of the robot controller 1. The processor 11 of the robot controller 1 functionally includes an output control unit 15, an operation sequence generation unit 16, a robot control unit 17, and a proposition determination unit 18. In FIG. 4, an example of data exchanged between blocks, but is not limited to this example. The same applies to the following diagrams illustrating other functional blocks.

The output control unit 15 generates the output control signal S2 for displaying an input view (also referred to as a "task view") in which information related to an objective task is designated by a worker, and transmits the output control signal S2 to the task instruction device 2 via the interface 13. For instance, the output control unit 15 displays an image (also referred to as a "workspace image") captured in the workspace included in the measurement signal S4 on the task view, and receives inputs based on various operations. The output control unit 15 receives the input signal S1 generated by the task instruction device 2 based on the input operation on the task view, from the task instruction device 2 through the interface 13. In this instance, the input signal S1 includes information (also referred to as "task designation information Ia") that roughly designates the objective task. The task designation information Ia is, for instance, information equivalent to a general instruction to the robot 5 and does not include information (for instance, information of a control input or information of the subtask which will be described later) that defines a specific operation of the robot 5. The output control unit 15 supplies the task designation information Ia based on the input signal S1 supplied from the task instruction device 2, to the operation sequence generation unit 16.

The output control unit 15 receives information concerning a completion determination result of the objective task (also referred to as a "determination result information Ie") from the proposition determination unit 18. In this instance, the output control unit 15 generates the output control signal S2 corresponding to information for notifying a completion of the objective task or information for notifying that the objective task has not been completed due to some abnormal occurrence (alert information), based on the determination result information Ie. After that, the output control unit 15 supplies the output control signal S2 to the task instruction device 2 via the interface 13. Accordingly, the task instruction device 2 performs a display or a sound output for notifying a normal completion of the objective task, or a display or a sound output for notifying that the objective task has not been normally completed.

The operation sequence generation unit 16 generates a subtask sequence "Sr" to be executed by the robot 5 based on the task designation information Ia supplied from the output control unit 15, the measurement signal S4, and the application information stored in the storage device 4. Note that in the first example embodiment, the operation sequence generation unit 16 generates the subtask sequence Sr necessary from a start to the completion of the objective task. Next, the operation sequence generation unit 16 supplies the generated subtask sequence Sr to the robot control unit 17. Here, the subtask sequence Sr includes information indicating an execution order and an execution timing of each of the subtasks.

The operation sequence generation unit 16 receives information (also referred to as "proposition request information Ic") requesting a generation of propositions related to the objective task from the proposition determination unit 18. In this case, the operation sequence generation unit 16 generates a proposition (also referred to as a "first proposition") representing a current state of the objective task and a proposition (also referred to as a "second proposition") representing the completion state of the objective task indicated in the task designation information Ia. Next, the operation sequence generation unit 16 supplies information (also referred to as "proposition information Id") indicating the generated first proposition and the generated second proposition to the proposition determination unit 18. The methods for generating the first proposition and the second proposition are described in detail in section (5-8) "Proposition Generation Unit".

The robot control unit 17 performs a control for the robot 5 to execute subtasks forming the subtask sequence Sr at respective defined execution timings (time steps) based on the subtask sequence Sr supplied from the operation sequence generation unit 16. Specifically, the robot control unit 17 executes a position control, a torque control, or the like of the joint of the robot 5 for realizing the subtask sequence Sr by transmitting the control signal S3 to the robot 5. Next, the robot control unit 17 supplies information (also referred to as "completion notification information Ib") notifying the execution completion of the subtask sequence Sr to the proposition determination unit 18 when an output of the control signal S3 to the robot 5 based on the subtask sequence Sr is completed (there is no more output).

The robot 5 may have a function corresponding to the robot control unit 17 instead of the robot controller 1. In this instance, the robot 5 receives the subtask sequence Sr from the operation sequence generation unit 16, and performs the position control or the torque control of the joint for realizing the subtask sequence Sr. Moreover, when the execution of the subtask sequence Sr is completed, the robot 5 supplies the completion notification informing Ib to the proposition determination unit 18 of the robot controller 1.

When the subtask sequence Sr is completed, the proposition determination unit 18 determines whether or not the objective task has completed normally (also called an "objective task completion determination"), based on a comparison between the propositions. Specifically, the proposition determination unit 18 supplies the proposition request information Ic to the operation sequence generation unit 16 when the completion notification information Ib is received from the robot control unit 17, and the proposition determination unit 18 receives the proposition information Id from the operation sequence generation unit 16 as a response. The proposition determination unit 18 compares the first proposition indicated by the proposition information Id with the second proposition, and generates the determination result information Ie indicating that the objective task has not been completed normally when these propositions are different from each other. On the other hand, the proposition determination unit 18 compares the first proposition indicated by the proposition information Id with the second proposition, and generates the determination result information Ie indicating that the objective task has completed normally when these propositions match. After that, the proposition determination unit 18 supplies the generated determination result information Ie to the output control unit 15.

Here, components respective to the output control unit 15, the operation sequence generation unit 16, the robot control unit 17, and the proposition determination unit 18 can be realized, for instance, by the processor 11 executing corresponding programs. Moreover, each of necessary programs may be recorded on any non-volatile recording medium and installed as necessary to realize each component. Note that at least a portion of each of these components may be implemented by any combination of hardware, firmware, software, and the like, without being limited to being implemented by software based on a program. At least some of these components may also be implemented using user programmable integrated circuit such as, for instance, a FPGA (Field-Programmable Gate Array), a microcontroller, or the like. In this case, the integrated circuit may be used to realize the program formed by each of the above components. Moreover, at least some of the components may be formed by an ASSP (Application Specific Standard Produce), an ASIC (Application Specific Integrated Circuit), or a quantum computer control chip. As described above, individual components may be implemented by various hardware. The above is the same in other example embodiments described later. Furthermore, for instance, these individual components may be implemented by a cooperation of a plurality of computers using cloud computing technology.

(5) Details of the Operation Sequence Generation Unit

Next, a process of the operation sequence generation unit 16 will be described in detail.

(5-1) Functional Block

Figure 5:
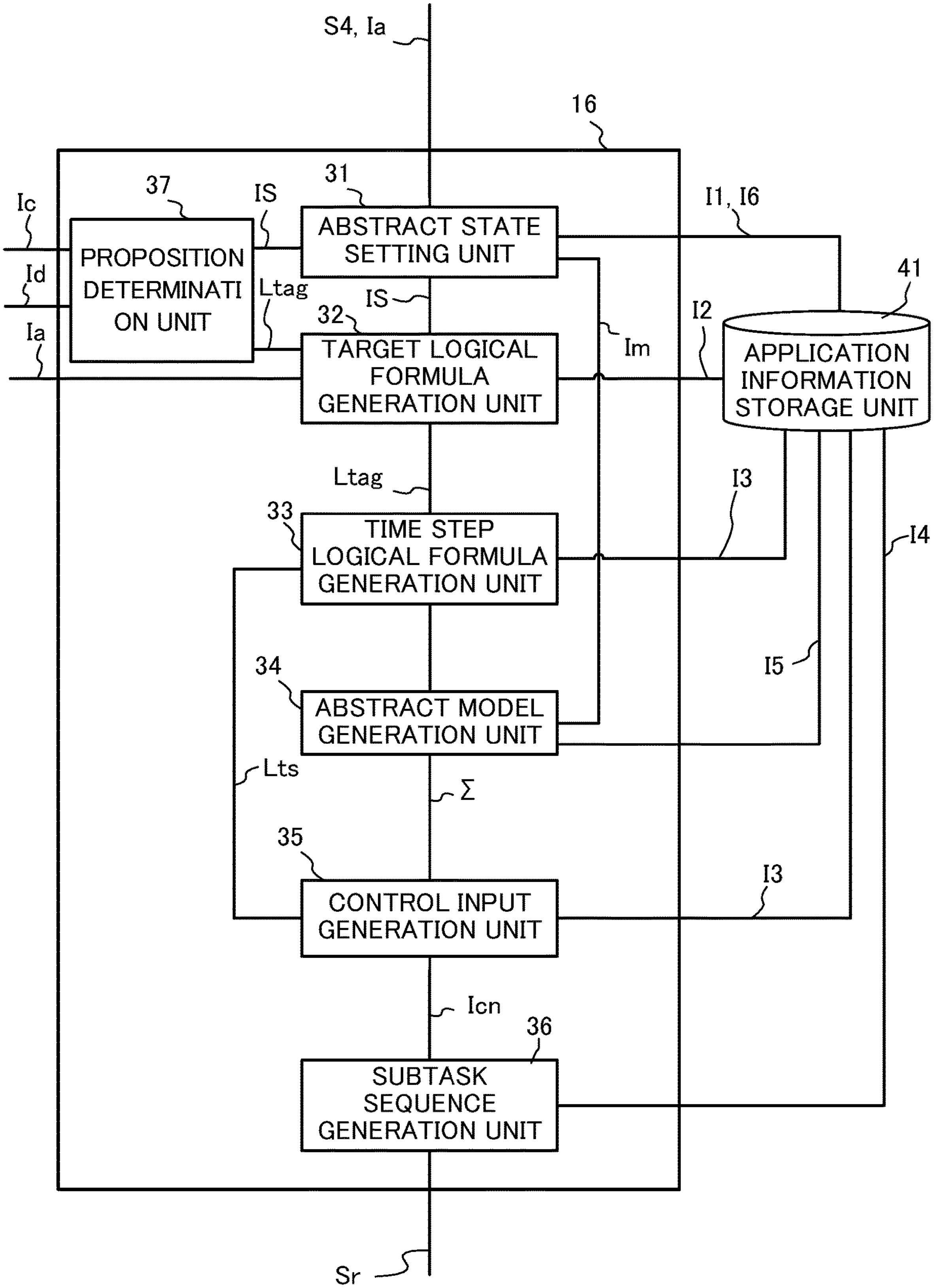
FIG. 5 illustrates an example of a functional block of an operation sequence generation unit.

FIG. 5 is an example of a functional block illustrating a functional configuration of the operation sequence generation unit 16. The operation sequence generation unit 16 functionally includes an abstract state setting unit 31, a target logical formula generation unit 32, a time step logical formula generation unit 33, an abstract model generation unit 34, a control input generation unit 35, a subtask sequence generation unit 36, and a proposition generation unit 37.

The abstract state setting unit 31 sets the abstract state in the workspace based on the measurement signal S4 supplied from the measurement device 7, the task designation information Ia supplied from the output control unit 15, the abstract state designation information I1, and the object model information I6. In this instance, the abstract state setting unit 31 recognizes an object that needs to be considered in the workspace when executing the objective task, and generates a recognition result Im related to the object. The abstract state setting unit 31 defines a proposition to be expressed by a logical formula for each abstract state that needs to be considered when executing the objective task based on the recognition result Im. When the task designation information Ia is supplied, the abstract state setting unit 31 supplies the information indicating the abstract state being set (also referred to as "abstract state setting information IS") to the target logical formula generation unit 32. Moreover, the abstract state setting unit 31 supplies the abstract state setting information IS indicating a state at a time when a request is received, to the proposition generation unit 37 based on the request from the proposition generation unit 37.

Based on the abstract state setting information IS, the target logical formula generation unit 32 converts the objective task indicated by the task designation information Ia into a logical formula (also called a "target logical formula Ltag") of a temporal logic representing a final achievement state. In this case, by referring to the constraint condition information I2 from the application information storage unit 41, the target logical formula generation unit 32 adds a constraint condition to be satisfied in executing the objective task to the target logical formula Ltag. The target logical formula generation unit 32 supplies the generated target logical formula Ltag to the time step logical formula generation unit 33 and the proposition generation unit 37.

The time step logical formula generation unit 33 converts the target logical formula Ltag supplied from the target logical formula generation unit 32 into a logical formula (also referred to as a "time step logical formula Lts") representing a state at each time step. After that, the time step logical formula generation unit 33 supplies the generated time step logical formula Lts to the control input generation unit 35.

The abstract model generation unit 34 generates an abstract model "Σ" in which the real dynamics in the workspace are abstracted, based on the abstract model information I5 stored in the application information storage unit 41 and a recognition result Im supplied from the abstract state setting unit 31. In this case, the abstract model generation unit 34 considers the target dynamics as the hybrid system in which continuous dynamics and discrete dynamics are mixed, and generates the abstract model E based on the hybrid system. A method for generating the abstract model E will be described later. The abstract model generation unit 34 supplies the generated abstract model E to the control input generation unit 35.

The control input generation unit 35 determines a control input to the robot 5 for each time step so that the time step logic formula Lts supplied from the time step logical formula generation unit 33 and the abstract model E supplied from the abstract model generation unit 34 are satisfied and so that an evaluation function (for instance, a function representing an amount of energy consumed by the robot) is optimized. Next, the control input generation unit 35 supplies information (also referred to as "control input information Icn") indicating the control input to the robot 5 for each time step to the subtask sequence generation unit 36.

The subtask sequence generation unit 36 generates the subtask sequence Sr based on the control input information Icn supplied from the control input generation unit 35 and the subtask information I4 stored in the application information storage unit 41, and supplies the subtask sequence Sr to the robot control unit 17.

The proposition generation unit 37 generates respective pieces of the proposition information Id representing the first proposition and the second proposition, based on the abstract state setting information IS supplied from the abstract state setting unit 31 and the target logical formula Ltag supplied from the target logical formula generation unit 32 when the proposition request information Ic is supplied from the proposition determination unit 18. After that, the proposition generation unit 37 supplies the generated proposition information Id to the proposition determination unit 18.

(5-2) Abstract State Setting Part

First, the abstract state setting unit 31 generates the recognition result Im by referring to the object model information I6 and analyzing the measurement signal S4 by a technique (a technique using an image processing technique, an image recognition technique, a speech recognition technique, a RFID (Radio Frequency Identifier, or the like) that recognizes an environment of the workspace. The recognition result Im includes such information as the type, the position, and the posture of the object in the workspace. The object in the workspace is, for instance, the robot 5, a target object such as a tool or a part handled by the robot 5, an obstacle, and another working body (a person or another object performing a work other than the robot 5), or the like.

Next, the abstract state setting unit 31 sets the abstract state in the workspace based on the recognition result Im and the abstract state designation information I1 acquired from the application information storage unit 41. In this case, first, the abstract state setting unit 31 refers to the abstract state specification information I1, and recognizes the abstract state to be set in the workspace. The abstract state to be set in a workspace varies depending on the type of the objective task. Therefore, in a case where the abstract state to be set for each type of the objective task is defined in the abstract state designation information I1, the abstract state setting unit 31 refers to the abstract state specification information I1 corresponding to the objective task indicated in the task designation information Ia, and recognizes the abstract state to be set.

Figure 6:
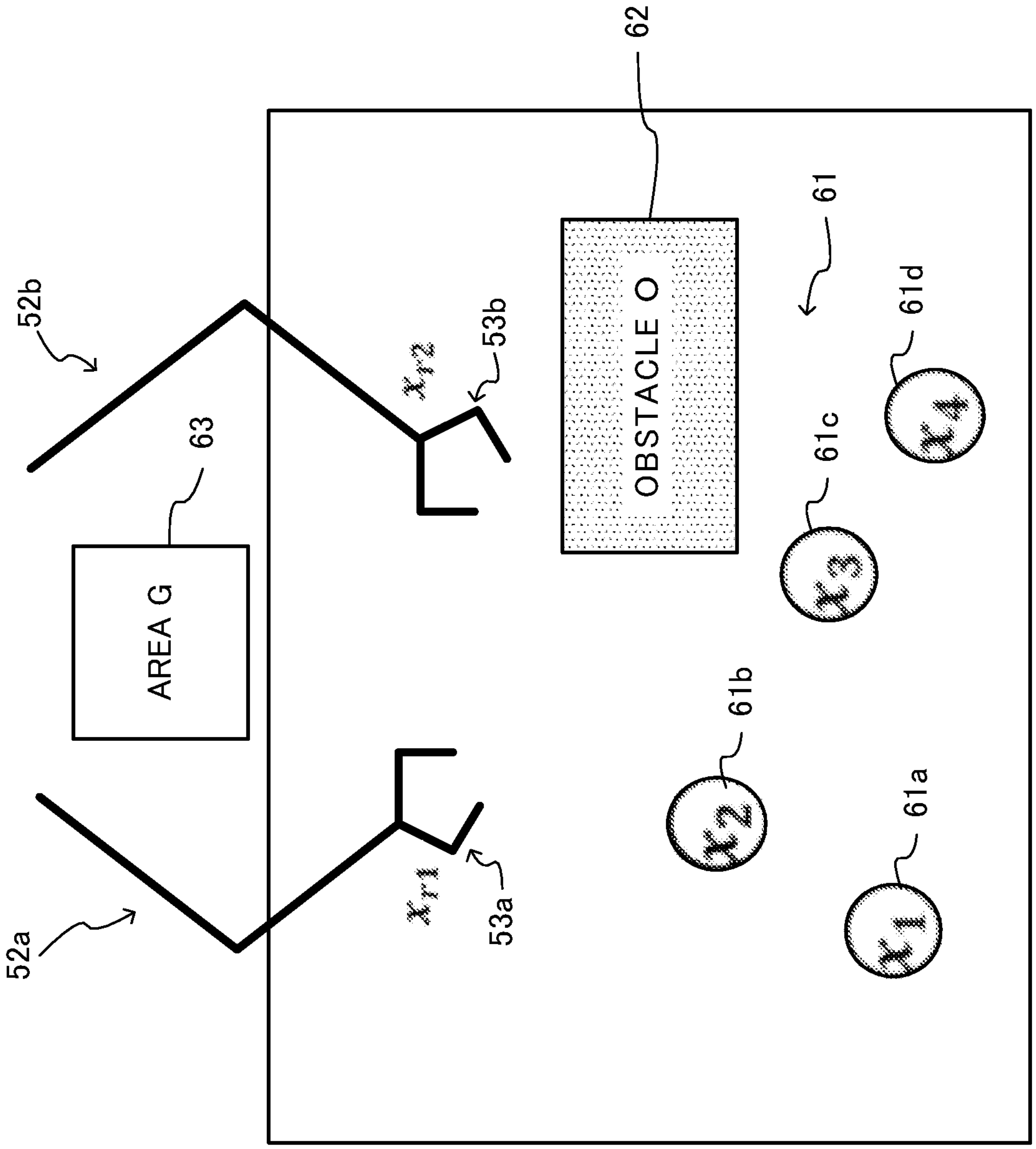
FIG. 6 is a bird's-eye view of a workspace in a case where an objective task is a pick-and-place.

FIG. 6 illustrates a bird's-eye view of the workspace when the objective task is the pick-and-place. In the workspace illustrated in FIG. 6, there are two robot arms 52*a* and 52*b*, four target objects 61(61*a* to 61*d*), an obstacle 62, and an area G as a destination of the object 61.

In this case, first, the abstract state setting unit 31 recognizes states of the objects 61, an existence range of the obstacle 62, a state of the robot 5, an existence range of the area G, and the like.

Here, the abstract state setting unit 31 recognizes position vectors "$x_1$" to "$x_4$" of each center of the target objects 61*a* to 61*d* as positions of the target objects 61*a* to 61*d*. In addition, the abstract state setting unit 31 recognizes a position vector "$x_{r1}$" of a robot hand 53*a* for grasping a target object and a position vector "$x_{r2}$" of a robot hand 53*b* for grasping a target object, as respective positions of the robot arm 52*a* and the robot arm 52*b*.

Similarly, the abstract state setting unit 31 recognizes postures of the target objects 61*a* to 61*d* (unnecessary for the target objects that are spherical in the example in FIG. 6), the existence range of the obstacle 62, the existence range of the area G, and the like. Note that for instance, in a case of regarding the obstacle 62 as a rectangular parallelepiped and the area G as a rectangle, the abstract state setting unit 31 recognizes position vectors respective to vertexes of the obstacle 62 and the area G.

The abstract state setting unit 31 determines each abstract state to be defined in the objective task by referring to the abstract state specification information I1. In this instance, the abstract state setting unit 31 determines a proposition indicating each abstract state based on the recognition result Im (for instance, the number of objects for each type) related to the objects existing in the workspace and the abstract state designation information I1.

In an example in FIG. 6, the abstract state setting unit 31 adds identification labels "1" to "4" respective to the target objects 61*a* to 61*d* specified by the recognition result Im. In addition, the abstract state setting unit 31 defines a proposition "$g_i$" that target objects "i" (i=1 to 4) exist in the area G which is a target point to be finally placed. Moreover, the abstract state setting unit 31 applies an identification label "O" to the obstacle 62, and defines a proposition "$o_i$" that the target object i is interfering with the obstacle O. Furthermore, the abstract state setting unit 31 defines a proposition "h" that the robot arms 52 interfere with each other. The abstract state setting unit 31 may further define a proposition "$v_i$" that the target object "i" exists in a work table (a table on which the target object and the obstacle exist in an initial state), a proposition "$w_i$" that the target object exists in a non-work area other than the work table and the area G, and another proposition. The non-work area is, for instance, an area (a floor surface, or the like) in which the target object exists when the object falls off the work table.

As described above, the abstract state setting unit 31 recognizes an abstract state to be defined by referring to the abstract state designation information I1, and defines a proposition (in the above-described example, $g_i$, $o_i$, h, and the like) representing the abstract state in accordance with the number of the target objects 61, the number of the robot arms 52, the number of the obstacles 62, the number of the robots 5, or the like. The abstract state setting unit 31 supplies information indicating a proposition representing the abstract state to the target logical formula generation unit 32 as the abstract state setting information IS.

(5-3) Target Logical Formula Generation Unit

First, the target logical formula generation unit 32 converts an objective task indicated by the task designation information Ia into a logical formula using the temporal logic.

For instance, in the example in FIG. 6, an objective task "finally there is the target object (i=2) in the area G" is given. In this instance, the target logical formula generation unit 32 generates a logical formula "$\diamond g_2$" by using an operator "$\diamond$" corresponding to "eventually" of a linear logical formula (LTL: Linear Temporal Logic) and the proposition "$g_i$" defined by the abstract state setting unit 31. Moreover, the target logical formula generation unit 32 may express a logical formula by using an operator of any temporal logic other than the operator "$\diamond$" (a logical product "$\wedge$", a logical sum "$\vee$", a negation "$\neg$", a logical inclusion "$\Rightarrow$", always "$\square$", next "$\circ$", until "U", or the like). Furthermore, not limited to the linear temporal logic, the logical formula may be expressed using any temporal logic such as a MTL (Metric Temporal Logic), a STL (Signal Temporal Logic), or the like.

Note that the task designation information Ia may be information designating the objective task in a natural language. Various techniques exist for converting a task expressed in the natural language into a logical formula.

Next, the target logical formula generation unit 32 generates the target logical formula Ltag by adding the constraint condition indicated by the constraint condition information I2 to the logical formula indicating the objective task.

For instance, when two constraint conditions corresponding to the pick-and-place illustrated in FIG. 6 are included in the constraint condition information I2: "the robot arms 52 do not always interfere with each other" and "the target object i does not always interfere with the obstacle O", the target logical formula generation unit 32 converts these constraint conditions into the logical formula. In detail, the target logical formula generation unit 32 converts the above-described two constraint conditions into the following logical formulae using the proposition "$o_i$" and the proposition "h" defined by the abstract state setting unit 31 in the description with reference to FIG. 6.

$$\square\neg h$$

$$\wedge_i \square\neg o_i$$

Accordingly, in this instance, the target logical formula generation unit 32 generates the following target logical formula Ltag by adding the logical formula of these constraint conditions to the logical formula "$\Diamond g_2$" corresponding to the objective task of "finally there is the object (i=2) in the area G".

$$(\Diamond g_2) \wedge (\square\neg h) \wedge (\wedge i \square\neg o_i)$$

In practice, the constraint conditions corresponding to the pick-and-place are not limited to the two constraint conditions described above, and the constraint conditions such as "the robot arms 52 do not interfere with the obstacle O", "the plurality of the robot arms 52 do not grab the same target object", "the target objects do not contact with each other", and the like may exist. Similarly, these the constraint conditions are stored in the constraint condition information I2 and reflected in the target logical formula Ltag.

(5-4) Time Step Logical Formula Generation Unit

The time step logical formula generation unit 33 determines the number of time steps (also referred to as a "target time step number") for completing the objective task, and determines a combination of propositions representing states at respective time steps such that the target logical formula Ltag is satisfied with the target time step number. Since there are generally a plurality of such combinations, the time step logical formula generation unit 33 generates a logical formula in which these combinations are combined by the logical sum, as the time step logical formula Lts. Each of the combinations described above becomes a candidate of the logical formula representing a sequence of operations to be instructed to the robot 5, and is also referred to as a "candidate φ" hereafter.

Here, a specific example of the process of the time step logical formula generation unit 33 in a case where the objective task of "finally there is the target object (i=2) in the area G." exemplified in the description with reference to FIG. 6 is set will be described.

In this instance, the following target logical formula Ltag is supplied from the target logical formula generation unit 32 to the time step logical formula generation unit 33.

$$(\Diamond g_2) \wedge (\square\neg h) \wedge (\wedge_i \square\neg o_i)$$

In this instance, the time step logical formula generation unit 33 uses a proposition "$g_i$, k" in which the proposition "$g_i$" is extended to include a concept of the time step. Here, the proposition "$g_i$,k" is the proposition that "the target object i exists in the area G in the time step k". Here, when the target time step number is set to "3", the target logical formula Ltag is rewritten as follows.

$$(\Diamond g_{2,3} \wedge) \wedge (\wedge_{k=1,2,3} \square\neg h_k) \wedge (\wedge_{k=1,2,3} \square\neg o_i)$$

Moreover, the "$\Diamond g_{2,3}$" can be rewritten as illustrated in the following expression.

[Math 1]

$$\Diamond g_{2,3} = (\neg g_{2,1} \wedge \neg g_{2,2} \wedge g_{2,3}) \vee (\neg g_{2,1} \wedge g_{2,2} \wedge g_{2,3}) \vee (g_{2,1} \wedge \neg g_{1,2} \wedge g_{2,3}) V (g_{2,1} \wedge g_{2,2} \wedge g_{2,3})$$

At this time, the target logical formula Ltag described above is expressed by the logical sum ($\varphi_1 \vee \varphi_2 \vee \varphi_3 \vee \varphi_4$) of the four candidates "$\varphi_1$" to "$\varphi_4$" illustrated below.

[Math 2]

$$\phi_1 = (\neg g_{2,1} \wedge \neg g_{2,2} \wedge g_{2,3}) \wedge (\wedge_{k=1,2,3} \square\neg h_k)(\wedge_{k=1,2,3} \square\neg o_{i,k})$$

$$\phi_2 = (\neg g_{2,1} \wedge g_{2,2} \wedge g_{2,3}) \wedge (\wedge_{k=1,2,3} \square\neg h_k)(\wedge_{k=1,2,3} \square\neg o_{i,k})$$

$$\phi_3 = (g_{2,1} \wedge g_{2,2} \wedge g_{2,3}) \wedge (\wedge_{k=1,2,3} \square\neg h_k)(\wedge_{k=1,2,3} \square\neg o_{i,k})$$

$$\phi_4 = (g_{2,1} \wedge g_{2,2} \wedge g_{2,3}) \wedge (\wedge_{k=1,2,3} \square\neg h_k)(\wedge_{k=1,2,3} \square\neg o_{i,k})$$

Therefore, the time step logical formula generation unit 33 defines the logical sum of the four candidates $\varphi_1$ to $\varphi_4$ as the time step logical formula Lts. In this case, the time step logical formula Lts becomes true in a case where at least one of the four candidates $\varphi_1$ to $\varphi_4$ becomes true.

Next, a method for setting the target number of the time steps will be supplementarily described.

For instance, the time step logical formula generation unit 33 determines the target time step number based on the estimated time for a work specified by the input signal S1 supplied from the task instruction device 2. In this case, the time step logical formula generation unit 33 calculates the target time step number from the estimated time described above based on information of a time width per one time step stored in the memory 12 or the storage device 4. In another example, the time step logical formula generation unit 33 stores information corresponding to the target time step number suitable for each type of the objective task in advance in the memory 12 or the storage device 4, and determines the target time step number in accordance with the type of the objective task to be executed by referring to the information.

Preferably, the time step logical formula generation unit 33 sets the target time step number to a predetermined initial value. Next, the time step logical formula generation unit 33 gradually increases the target time step number until the time step logical formula Lts, in which the control input generation unit 35 can determine the control input, is generated. In this case, the time step logical formula generation unit 33 adds the target time step number by a predetermined number (an integer of 1 or more), when an optimal solution cannot be derived as a result of the control input generation unit 35 performing an optimization process by the target time step number being set.

At this time, it is preferable that the time step logical formula generation unit 33 sets an initial value of the target time step number to be a value which is smaller than the number of time steps corresponding to the task time of the objective task expected by the user. By this setting of the initial value, it is possible for the time step logical formula generation unit 33 to preferably suppress unnecessarily setting of a large target time step number.

(5-5) Abstract Model Generation Unit

The abstract model generation unit 34 generates the abstract model E based on the abstract model information I5 and the recognition result Im. Here, in the abstract model information IS, information necessary for generating of the abstract model E is recorded for each type of the objective task. For instance, in a case where the objective task is the pick-and-place, each general purpose abstract model, which does not specify the positions or number of the target objects, a position of an area where the target objects are placed, the number of the robots 5 (or the number of the robot arms 52), or the like, is recorded in the abstract model information IS. Next, the abstract model generation unit 34 generates the abstract model E by reflecting the recognition result Im on the abstract model of the general purpose type which includes the dynamics of the robot 5 and is recorded in the abstract model information IS. Accordingly, the abstract model E is a model in which the state of the objects in the workspace and the dynamics of the robot 5 are abstractly expressed. In a case of the pick-and-place, the state of the objects in the workspace indicates respective positions and the number of the target objects, the position of the area where the target objects are to be placed, the number of the robots 5, and the like.

Note that in a case where there are other working bodies, information concerning the abstracted dynamics of the other working bodies may be included in the abstract model information IS. In this case, the abstract model E corresponds to a model in which the state of the objects in the workspace, the dynamics of the robot 5, and the dynamics of the other working bodies are abstractly expressed.

Here, the dynamics in the workspace are frequently switched when the robot 5 is working on the objective task by. For instance, in the pick-and-place, in a case where the robot arms 52 is grabbing the target object i, it is possible to move the target object i; however, in a case where the robot arms 52 is not grabbing the target object i, it is not possible to move the target object i.

Considering the above cases, in the present example embodiment, in a case of the pick-and-place, an operation of grasping the target object i is abstractly expressed by a logical variable "$\delta_i$". In this case, for instance, the abstract model generation unit 34 can determine the abstract model E to be set for the workspace illustrated in FIG. 6 by the following equation (1).

[Math 3]

$$\begin{bmatrix} x_{r1} \\ x_{r2} \\ x_1 \\ \vdots \\ x_4 \end{bmatrix}_{k+1} = I\begin{bmatrix} x_{r1} \\ x_{r2} \\ x_1 \\ \vdots \\ x_4 \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \end{bmatrix}\begin{bmatrix} u_1 \\ u_2 \end{bmatrix} \tag{1}$$

$$h_{ij_{min}}(1-\delta_i) \leq h_{ij}(x) \leq h_{ij_{max}}\ \delta_i + (\delta_i - 1)\varepsilon$$

Here, "$u_j$" denotes the control input for controlling a robot hand j ("j=1" indicates the robot hand 53*a*, "j=2" indicates the robot hand 53*b*), "I" denotes a unit matrix, and "0" denotes a zero matrix. It is herein assumed that the control input is assumed to indicate a speed as an example, but the control input may indicate an acceleration. Moreover, "$\delta_j$, i" denotes a logical variable that is set to "1" when the robot hand j is grabbing the target object i and is set to "0" in other cases. In addition, each of "$x_{r1}$" and "$x_{r2}$" indicates the position vector of the robot hand j (j=1, 2), and each of "$x_1$" to "$x_4$" indicates the position vector of the target object i (i=1 to 4). Furthermore, "h(x)" denotes a variable that satisfies "h(x)>=0" when the robot hand exists in a vicinity of the target object to the extent that the robot hand can grasp the target object, and satisfies the following relationship with the logical variable E.

$$\delta = 1 \Leftrightarrow h(x) \geqq 0$$

In this expression, in a case where the robot hand exists in the vicinity of the target object to the extent that the robot hand can grip the target object, the robot hand is assumed to be gripping the target object, and the logical variable δ is set to 1.

Here, the equation (1) is a difference equation representing the relationship between the state of the objects at the time step k and the state of the objects at the time step k+1. Accordingly, in the above equation (1), since the state of the grasp is represented by a logical variable that is a discrete value, and each movement of the objects is represented by a continuous value, the equation (1) represents the hybrid system.

It is considered in the equation (1) that only the dynamics of the robot hand, which is the hand tip of the robot 5 actually grasping the object, is considered, rather than the detailed dynamics of the entire robot 5. By this consideration, it is possible to preferably reduce a calculation amount of the optimization process by the control input generation unit 35.

Moreover, the abstract model information I5 includes information concerning the logical variable corresponding to the operation (the operation of grasping the target object i in the case of the pick-and-place) causing the dynamics to switch, and information for deriving a difference equation according to the equation (1) from the recognition result Im. Therefore, it is possible for the abstract model generation unit 34 to determine the abstract model E suitable for the environment of a target workspace based on the abstract model information IS and the recognition result Im, even in a case where the position or the number of the target objects, the area (the area G in FIG. 6) where the target objects are placed, the number of the robots 5, or the like varies.

It is noted that, in place of the model shown in the equation (1), the abstract model generation unit 34 may generate any other hybrid system model such as mixed logical dynamical (MLD) system, Petri nets, an automaton, or their combination.

(5-6) Control Input Generation Unit

The control input generation unit 35 determines an optimal control input for the robot 5 with respect to each time step based on the time step logical formula Lts supplied from the time step logical formula generation unit 33 and the abstract model E supplied from the abstract model generation unit 34. In this case, the control input generation unit 35 defines the evaluation function for the objective task and solves an optimization problem of minimizing the evaluation function with the abstract model E and the time step logical formula Lts which function as constraint conditions. For instance, the evaluation function is predetermined for each type of the objective task and stored in the memory 12 or the storage device 4.

For instance, when the objective task is the pick-and-place task, the control input generation unit 35 determines the evaluation function so that a distance "$d_k$" and a control input "$u_k$" between the target object to be carried and the target point to carry the target object are minimized (that is, the energy consumed by the robot 5 is minimized). The distance $d_k$ described above corresponds to a distance at the time step k between the target object (i=2) and the area G for the objective task "finally there is the target object (i=2) in the area G".

In this case, for instance, the control input generation unit 35 determines the evaluation function to be the sum of the square of the distance $d_k$ and the square of the control input $u_k$ in all time steps. Next, the control input generation unit 35 solves the constrained mixed integer optimization problem shown in the following equation (2) with the abstract model Σ and the time step logical formula Lts (that is, the logical OR of the candidates $\varphi_i$) which function as the constraint conditions.

[Math 4]

$$\min_{u}\left(\sum_{k=0}^{T}\left(\|d_k\|_2^2+\|u_k\|_2^2\right)\right) \quad (2)$$

$$\text{s.t. } \Sigma$$

$$\vee\, \phi_i$$

Here, "T" denotes the number of time steps to be optimized, and may be the target time step number or may be a predetermined number smaller than the target time step number as described later. In this case, the control input generation unit 35 approximates the logical variable to a continuous value (that is, solve a continuous relaxation problem). Thereby, the control input generation unit 35 can preferably reduce the calculation amount. Note that in a case where STL is adopted instead of the linear temporal logic (LTL), it can be described as a nonlinear optimization problem.

Furthermore, in a case where the target time step number is long (for instance, larger than a predetermined threshold value), the control input generation unit 35 may set the time step number to be used for the optimization to a value (for instance, the threshold value described above) smaller than the target time step number. In this case, the control input generation unit 35 sequentially determines the control input $u_k$ by solving the optimization problem described above, for example, every time a predetermined number of time steps elapses.

Preferably, the control input generation unit 35 may solve the optimization problem described above for each predetermined event corresponding to an intermediate state for the accomplishment state of the objective task, and determine the control input $u_k$ to be used. In this case, the control input generation unit 35 determines the time step number to be used for the optimization to be the number of time steps up to a next event occurrence. The event described above is, for instance, an event in which the dynamics switches in the workspace. For instance, when the pick-and-place is the objective task, examples of the event include "the robot 5 grasps the target object" and "the robot 5 completes carrying one target object among a plurality of the target objects to the destination point". For instance, the event is predetermined for each type of the objective task, and information indicative of one or more events for each type of the objective task is stored in the storage device 4.

(5-7) Subtask Sequence Generation Unit

The subtask sequence generation unit 36 generates the subtask sequence Sr based on control input information Icn supplied from the control input generation unit 35 and the subtask information I4 stored in the application information storage unit 41. In this instance, the subtask sequence generation unit 36 recognizes the subtask that can be accepted by the robot 5 by referring to the subtask information I4, and converts the control input for each time step indicated by the control input information Icn into a subtask.

For instance, in the subtask information I4, there are defined functions representing two subtasks, the movement (reaching) of the robot hand and the grasping by the robot hand, as subtasks that can be accepted by the robot 5 when the objective task is the pick-and-place. In this case, a function "Move" representing the reaching is a function that uses the following three arguments (parameters): the initial state of the robot 5 before the function is executed; the final state of the robot 5 after the function is executed; and the time to be necessary for executing the function. In addition, a function "Grasp" representing the grasping is a function that uses the following these arguments: the state of the robot 5 before the function is executed; the state of the target object to be grasped before the function is executed; and the logical variable δ. Here, the function "Grasp" indicates performing a grasping operation when the logical variable δ is "1", and indicates performing a releasing operation when the logic variable δ is "0". In this case, the subtask sequence generation unit 36 determines the function "Move" based on a trajectory of the robot hand determined by the control input for each time step indicated by the control input information Icn, and determines the function "Grasp" based on a transition of the logical variable δ for each time step indicated by the control input information Icn.

The subtask sequence generation unit 36 generates a subtask sequence Sr configured by the function "Move" and the function "Grasp", and supplies the subtask sequence Sr to the robot control unit 17. For instance, in a case where the objective task is "the target object (i=2) is finally present in the area G", the subtask sequence generation unit 36 generates the subtask sequence Sr of the function "Move", the function "Grasp", the function "Move", and the function "Grasp" for the robot hand closest to the target object (i=2). In this case, the robot hand closest to the target object (i=2) moves to the position of the target object (i=2) by the first function "Move", grasps the target object (i=2) by the first function "Grasp", moves to the area G by the second function "Move", and places the target object (i=2) in the area G by the second function "Grasp".

(5-8) Proposition Generation Unit

The proposition generation unit 37 generates pieces of the proposition information Id respectively representing the first proposition and the second proposition based on the abstract state setting information IS supplied from the abstract state setting unit 31 and the target logical formula Ltag supplied from the target logical formula generation unit 32 in a case where the proposition request information Ic is supplied from the proposition determination unit 18. Here, the generations of the first proposition and the second proposition will be described respectively.

First, the generation of the first proposition will be described. The proposition generation unit 37 generates the first proposition abstractly representing the current state concerning the objective task based on the abstract state setting information IS generated by the abstract state setting unit 31 at a time point when the proposition request information Ic is supplied from the proposition determination unit 18 (that is, at a time point of an execution completion of the subtask sequence Sr). In this case, the proposition generation unit 37 generates the first proposition in which a portion representing the state of the objects necessary for a completion determination of the objective task is extracted from among propositions indicated by the abstract state setting information IS. Here, the "object necessary for the completion determination of the objective task" is, for instance, a work target object (work), and in the example in FIG. 6 corresponds to the target objects 61*a* to 61*d*

Note that the "object necessary for the completion determination of the objective task" may be determined for each type of the objective task. In this case, for instance, the storage device 4 or the memory 12 stores information in which the "object necessary for the completion determination of the objective task" is specified for each type of the objective task, and the proposition generation unit 37 determines the "object necessary for the completion determination of the objective task" by referring to the information. For instance, in a case of the objective task illustrated in FIG. 6, the proposition generation unit 37 generates the first proposition representing the state of the target objects "i" (i=1 to 4).

Here, in the example in FIG. 6, a case where the objective task is normally completed by the robot 5 executing the subtask sequence Sr will be considered. In this case, all target objects are present in the area G. Accordingly, the proposition generation unit 37 uses a proposition "$g_i$" that the target objects "i" (i=1 to 4) exist in the area G and generate the first proposition illustrated in the following equation (3), for instance.

$$g_1 \wedge g_2 \wedge g_3 \wedge g_4 \quad (3)$$

Next, a case is considered where the robot 5 drops the target object (i=2) during an execution of the subtask sequence Sr, the target object moves to the non-work area, and thus the objective task is not completed normally. In this instance, the proposition generation unit 37 further uses the proposition "$w_i$" that the target objects exist in the work table and the non-work area other than the area G to generate the first proposition illustrated in the following equation (4).

$$g_1 \wedge w_2 \wedge g_3 \wedge g_4 \quad (4)$$

As described above, the proposition generation unit 37 preferably generates the first proposition that abstractly represents the current state concerning the objective task by referring to the abstract state setting information IS generated based on the measurement signal S4 at a time when the robot 5 has completed an execution of the subtask sequence Sr. Note that in receiving the abstract state setting information IS from the abstract state setting unit 31, the proposition generation unit 37 may receive the recognition result Im generated based on the measurement signal S4. In this instance, the proposition generation unit 37 generates the first proposition that abstractly represents the current state (the state of the target objects in FIG. 6) concerning the objective task based on the recognition result Im.

Next, the generation of the second proposition will be described. The proposition generation unit 37 generates the second proposition abstractly representing the completion state of the objective task based on the target logical formula Ltag supplied from the target logical formula generation unit 32. In this case, the proposition generation unit 37 excludes the logical formula of the constraint condition included in the target logical formula Ltag, and generates the second proposition using only a logical formula corresponding to the objective task. For instance, in the example in FIG. 6, the proposition generation unit 37 generates the second proposition illustrated in the following equation (5) in which various constraint conditions such as not interfering with the obstacle and the like are excluded from the target logical formula Ltag.

$$\diamond g_1 \wedge \diamond g_2 \wedge \diamond g_3 \wedge \diamond g_4 \quad (5)$$

Preferably, the proposition generation unit 37 generates the second proposition by further deleting a predetermined operator such as the operator "$\diamond$" corresponding to "eventually", which does not affect the completion determination of the objective task from the target logical formula Ltag. In this case, the information of the operator to be deleted is previously stored, for instance, in the storage device 4 or the memory 12. In this case, the proposition generation unit 37 generates the second proposition illustrated in the following equation (6).

$$g_1 \wedge g_2 \wedge g_3 \wedge g_4 \quad (6)$$

As described above, the proposition generation unit 37 preferably generates the second proposition that abstractly represents the completion state of the objective task by using the target logical formula Ltag which is generated based on the objective task specified by the task designation information Ia or the like. Note that instead of the target logical formula Ltag, the proposition generation unit 37 may receive a logical formula in which constraint conditions or the like are excluded from the target logical formula Ltag, from the target logical formula generation unit 32.

(6) Details of the Proposition Determination Unit

Next, a specific example of a process, which the proposition determination unit 18 executes using the first proposition and the second proposition which are generated by the proposition generation unit 37 of the operation sequence generation unit 16, will be described.

The proposition determination unit 18 determines that the objective task has been normally completed when the first proposition and the second proposition, which are indicated by the proposition information Id received from the operation sequence generation unit 16, match. For instance, in a case of receiving the proposition information Id indicating the first proposition illustrated in the equation (3) and the second proposition illustrated in the equation (6), since the equation (3) and the equation (6) are identical, the proposition determination unit 18 determines that the first proposition and the second proposition match, and determines that the objective task has completed normally.

On the other hand, in a case where the first proposition and the second proposition, which are indicated by the proposition information Id received from the operation sequence generation unit 16, do not match, the proposition determination unit 18 determines that the objective task has not normally completed. For instance, when receiving the proposition information Id indicating the first proposition illustrated in the equation (4) and the second proposition illustrated in the equation (6), the proposition determination unit 18 determines that the logical formula representing the state of the object (i=2) indicates "$w_2$" in the first proposition and "$g_2$" in the second proposition, and determines that the equation (4) and the equation (6) are different from each other. Therefore, in this case, since the first proposition and the second proposition do not match, the proposition determination unit 18 determines that the objective task has not normally completed.

Note that in a case where the predetermined operator such as the operator "◇" corresponding to "eventually" which does not affect the completion determination of the objective task is attached to the second proposition, the proposition determination unit 18 does not regard a presence or absence of the operator as a difference, and thus determines whether or not the first proposition and the second proposition described above match. Accordingly, when receiving the proposition information Id indicating the first proposition illustrated in the equation (3) and the second proposition illustrated in the equation (5), since the equation (3) and the equation (5) are the same except for the operator "◇", the proposition determination unit 18 determines that the first proposition and the second proposition match and the objective task has completed normally.

As described above, the proposition determination unit 18 can accurately perform the completion determination of the objective task based on the first proposition and the second proposition which are generated by the proposition generation unit 37.

(7) Details of the Output Control Unit

Details of a process of the output control unit 15 will be described. In the following, a display example of a task view, which is displayed by the task instruction device 2 based on the control of the output control unit 15, will be described with reference to FIG. 7 to FIG. 9.

Figure 7:
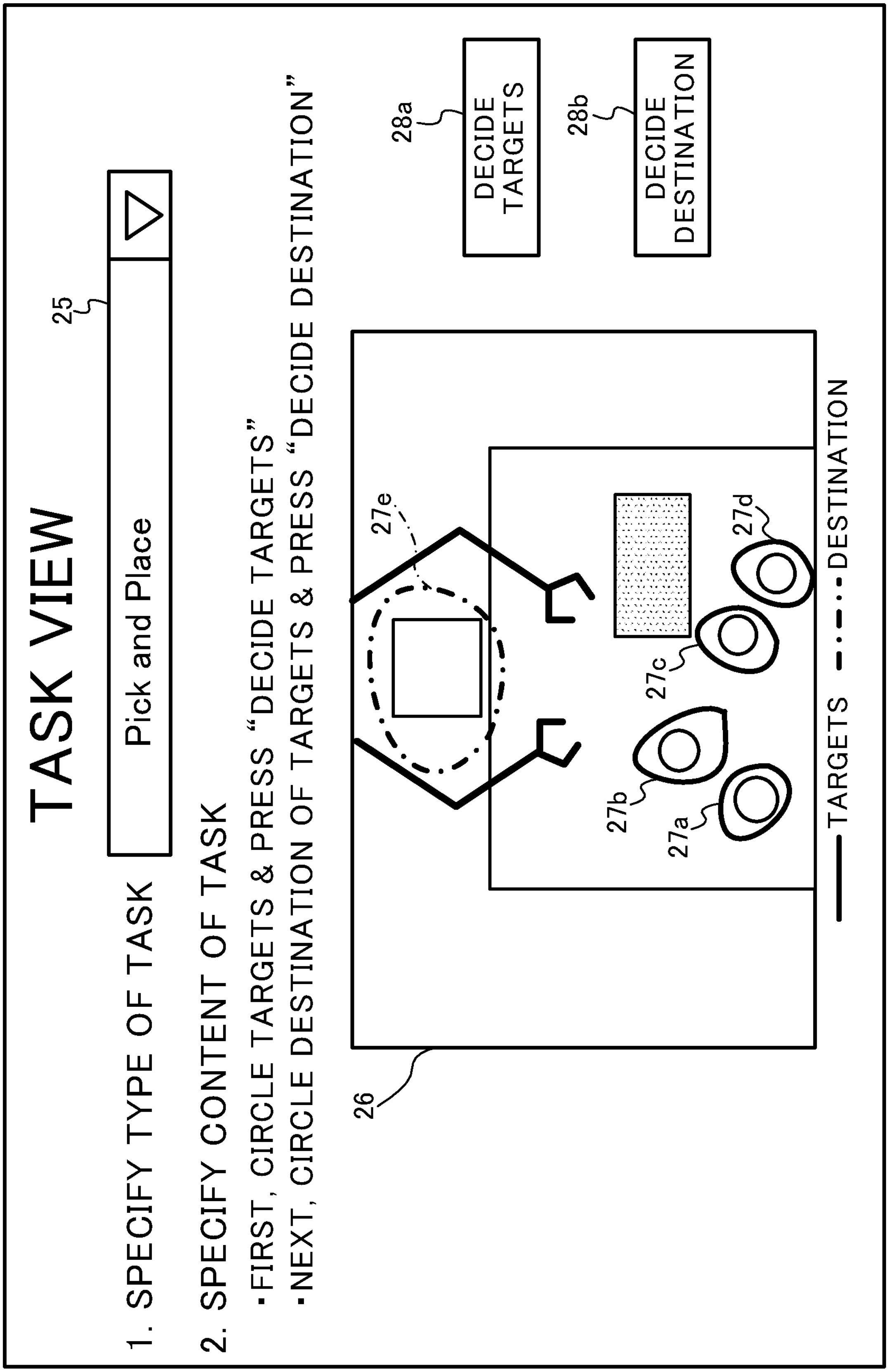
FIG. 7 is an example of displaying a task view for designating the objective task.

FIG. 7 illustrates an example of displaying the task view for designating an objective task. The output control unit 15 generates an output control signal S2, and transmits the output control signal S2 to the task instruction device 2 in order to control the task view illustrated in FIG. 7 to be displayed on the task instruction device 2. The task view illustrated in FIG. 7 mainly includes a task type designation field 25, a workspace image display field 26, and various buttons 28 (28*a* and 28*b*).

The output control unit 15 receives an input designating the type of the objective task in the task type designation field 25. Here, as an example, the task type designation field 25 corresponds to an input field in a pull-down menu form, and the output control unit 15 displays, in the task type designation field, a list in which a candidate for the type of an acceptable objective task can be selected. In this case, the pick-and-place is designated as the type of the objective task in the task type designation field 25.

Furthermore, the output control unit 15 displays, in the workspace image display field 26, a workspace image captured by the measurement device 7 in the workspace, and receives a designation necessary for the execution of the objective task designated in the task type designation field 25. In an example in FIG. 7, the output control unit 15 refers to the abstract state designation information I1 corresponding to the pick-and-place selected in the task type designation field 25, and recognizes that target objects to be worked by the robot 5 and a destination of the target objects need to be determined. Therefore, the output control unit 15 receives inputs for respectively designating the target objects and the destination on the workspace image display field 26. Here, as an example, the output control unit 15 displays respective marks 27*a* to 27*d* specifying the target objects by solid lines, and displays a mark 27*e* specifying the destination by a dashed line. Next, when detecting that a target object determination button 28*a* is selected, the output control unit 15 recognizes position information of the marks 27*a* to 27*d* drawn by the user as information specifying positions of the target objects. Furthermore, when detecting that the destination determination button 28*b* is further selected, the output control unit 15 recognizes position information of the mark 27*e* drawn by the user after the target object determination button 28*a* is selected, as information specifying the destination. Next, the output control unit 15 supplies the information (in this case, the position information of the respective marks on the workspace image) specifying these target objects and the destination to the operation sequence generation unit 16 as the task designation information Ia.

As such, according to the task view illustrated in FIG. 7, the output control unit 15 preferably receives user inputs concerning a designation of the type of the objective task and a designation of the objects concerning the objective task, and can preferably acquire the task designation information Ia.

Instead of receiving inputs which circle the target objects and the destination, the output control unit 15 may receive inputs which respectively designate a part of pixels forming the target objects and the destination by a touch operation or a click operation. In this instance, the output control unit 15 regards the position information of each of the designated pixels as information for designating the target objects and the destination, and supplies the information to the operation sequence generation unit 16 as the task designation information Ia. In another example, the output control unit 15 may generate the task designation information Ia based on the recognition result Im concerning the target objects and the destination, without depending on the user inputs on the workspace image display field 26.

Figure 8:
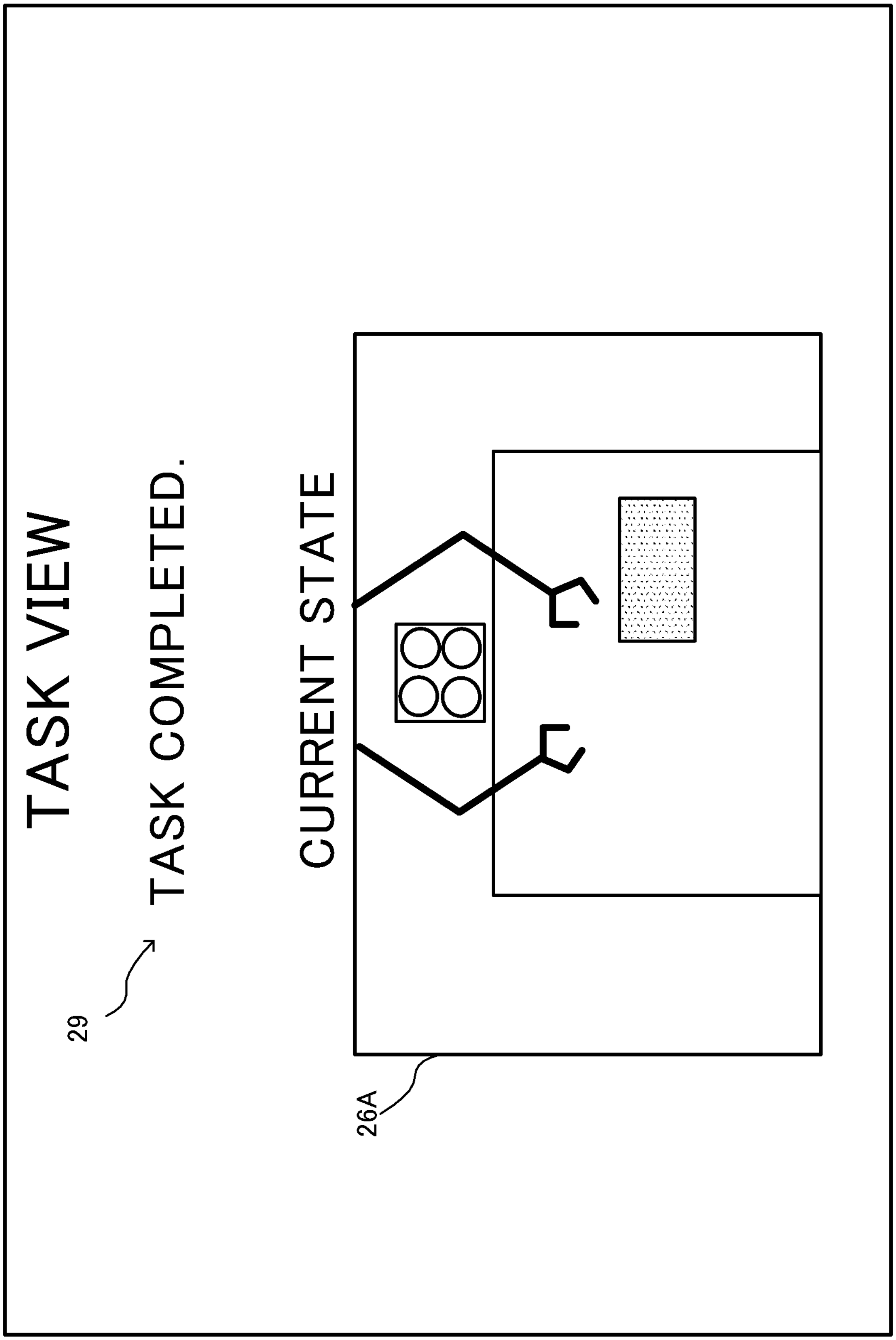
FIG. 8 is an example of displaying the task view when the objective task is normally completed.

FIG. 8 illustrates an example of displaying the task view when the objective task designated in FIG. 7 has normally completed. The output control unit 15 generates the output control signal S2 based on the determination result information Ie received from the proposition determination unit 18, and controls the task view illustrated in FIG. 8 to be displayed on the task instruction device 2 by sending the output control signal S2 to the task instruction device 2. The task view illustrated in FIG. 8 mainly includes a notification area 29 and a workspace image display field 26A.

Here, in an example in FIG. 8, all four spherical objects designated as the target objects in FIG. 7 are placed on a rectangular area designated as the destination in FIG. 7. In this case, the first proposition representing the current state of the objective task matches with the second proposition representing the completion state of the objective task, and the determination result information Ie indicating that the objective task has completed normally is generated by the proposition determination unit 18.

In this case, since the determination result information Ie received from the proposition determination unit 18 indicates a normal completion of the objective task, the output control unit 15 displays a text message indicating that the objective task completed in the notification area 29. Moreover, the output control unit 15 displays the workspace image based on the most recent measurement signal S4 on the workspace image display field 26A.

According to the display example of the task view illustrated in FIG. 8, the output control unit 15 can preferably notify the user by the task view that the designated objective task has been completed.

Figure 9:
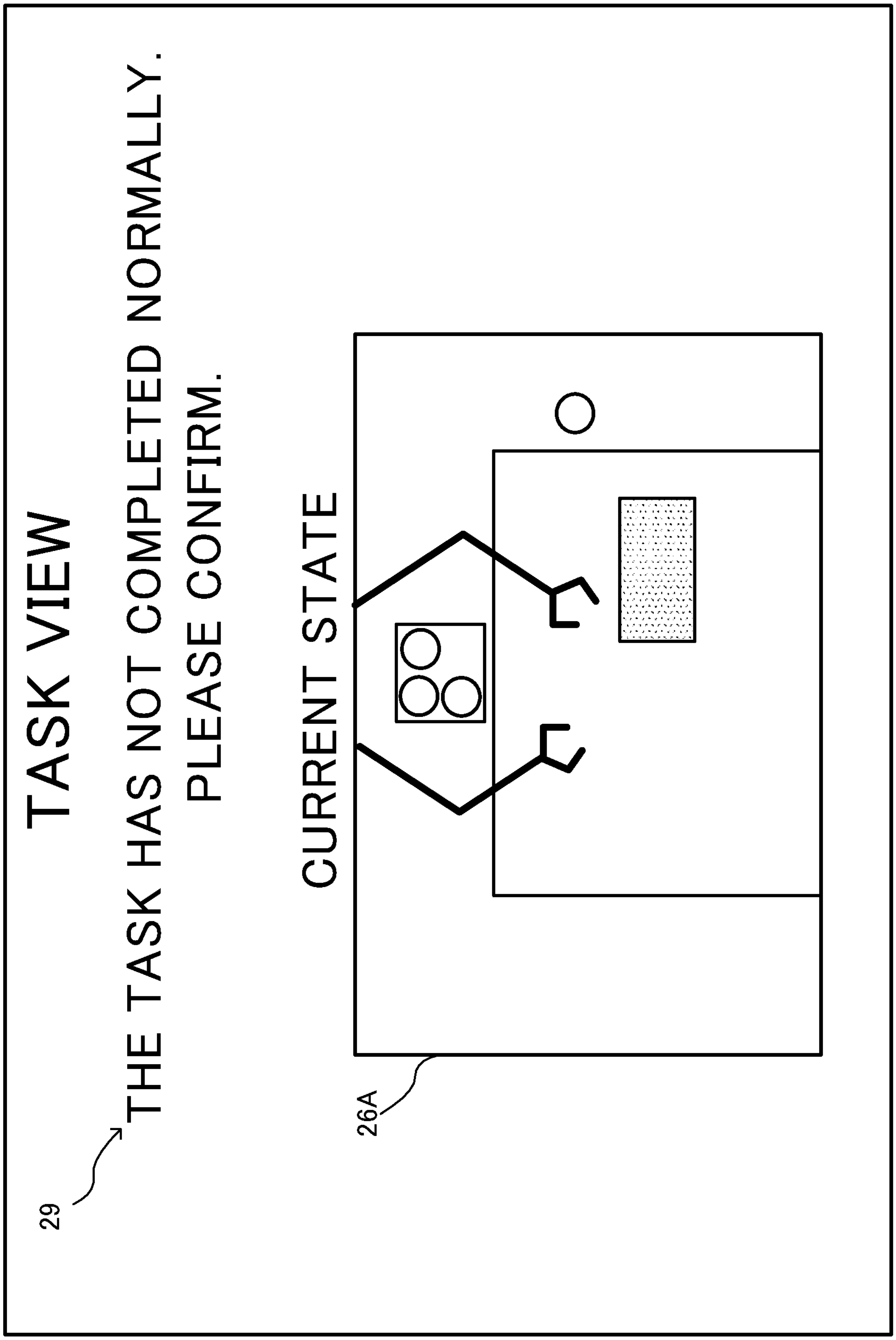
FIG. 9 is an example of displaying the task view when an objective task view is not normally completed.

FIG. 9 illustrates an example of displaying the task view when the objective task designated in FIG. 7 has not completed normally. The output control unit 15 generates the output control signal S2 based on the determination result information Ie received from the proposition determination unit 18, and controls the task view illustrated in FIG. 9 to be displayed on the task instruction device 2 by sending the output control signal S2 to the task instruction device 2. The task view illustrated in FIG. 9 includes the notification area 29 and the workspace image display field 26A in the same manner as the task view in FIG. 8.

In an example in FIG. 9, three of the four spherical objects designated as target objects are placed on the table designated as the destination in FIG. 7. On the other hand, a remaining one spherical object designated as the object is falling into the non-work area due to some accident. In this case, since the first proposition representing the current state of the objective task is different from the second proposition representing the completion state of the objective task, the determination result information Ie indicating that the objective task has not completed normally is generated by the proposition determination unit 18.

In this case, the output control unit 15 displays a text message indicating that the objective task has not completed normally in the notification area 29 based on the determination result information Ie received from the proposition determination unit 18. Moreover, the output control unit 15 displays the workspace image based on the most recent measurement signal S4 on the workspace image display field 26A.

According to the display example of the task view illustrated in FIG. 9, it is possible for the output control unit 15 to preferably notify the user of the alert for the fact that the designated objective task has not completed normally by the task view.

(8) Process Flow

Figure 10:
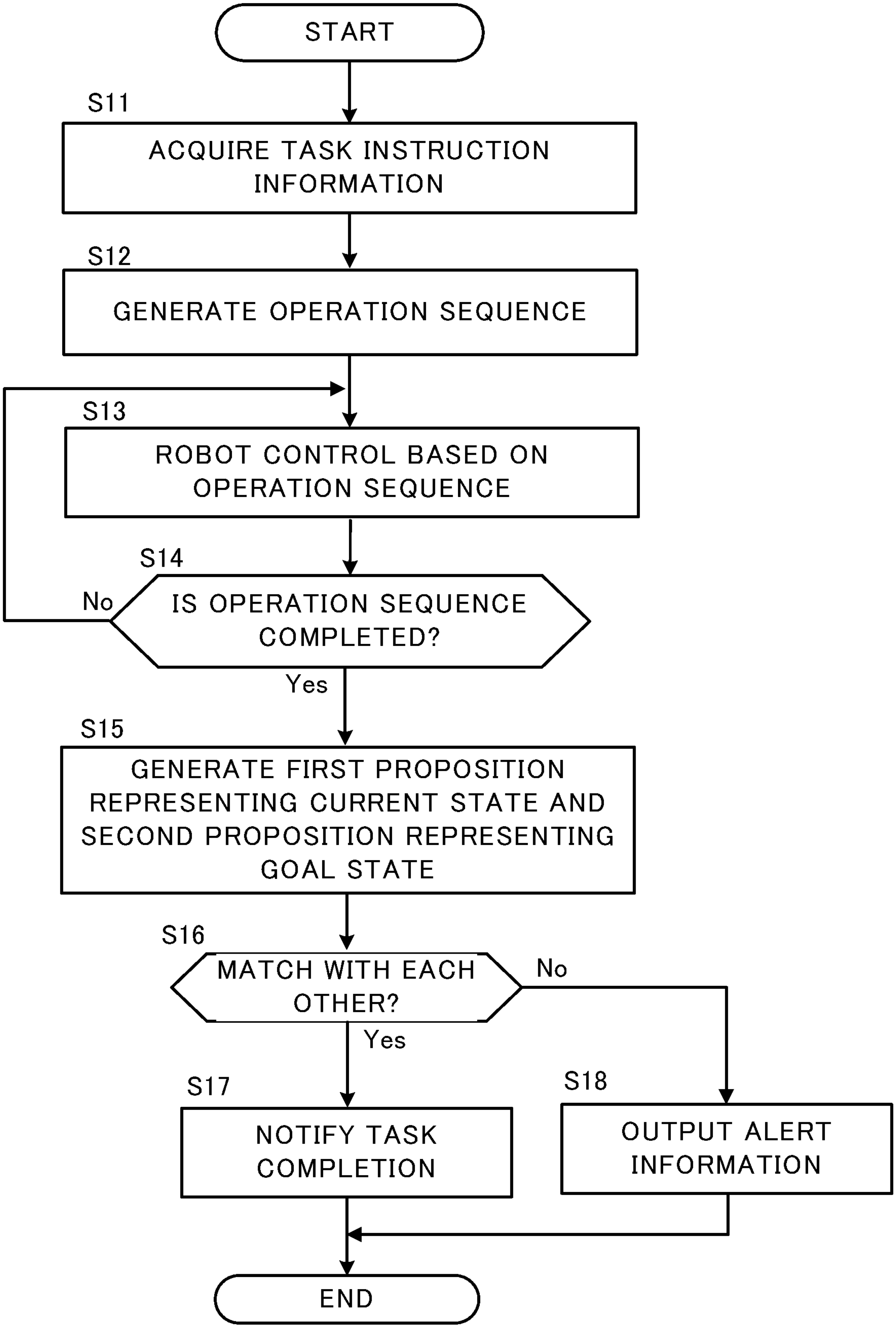
FIG. 10 is a flowchart of a robot control process which a robot controller executes in a first example embodiment.

FIG. 10 is an example of a flowchart illustrating an outline of a robot control process which is executed by the robot controller 1 in the first example embodiment.

First, the output control unit 15 of the robot controller 1 acquires the task designation information Ia (step S11). In this instance, for instance, the output control unit 15 transmits the output control signal S2 for displaying the task view to the task instruction device 2 via the interface 13, and the task instruction device 2 displays the task view based on the output control signal S2. After that, when the input signal S1 concerning the designation of the objective task is received from the task instruction device 2 which are displaying the task view, the output control unit 15 acquires the input signal S1 as the task designation information Ia.

The operation sequence generation unit 16 generates the subtask sequence Sr which is the operation sequence of the robot 5, based on the task designation information Ia acquired in step S11 and the measurement signal S4 (step S12). In this case, the operation sequence generation unit 16 performs a recognition of the object in the workspace, which is necessary for generating the subtask sequence Sr, and generates the subtask sequence Sr necessary for completing the objective task indicated by the task designation information Ia.

Next, the robot control unit 17 sequentially supplies the control signal Sr based on the generated subtask sequence S3 to the robot 5, and controls the robot 5 to operate in accordance with the generated subtask sequence Sr (step S13).

Next, the robot control unit 17 determines whether or not the subtask sequence Sr has been completed (step S14). In this case, the robot control unit 17 determines that the subtask sequence Sr has been completed, for instance, when there is no control signal to be output to the robot 5 based on the subtask sequence Sr (that is, the output of the control signal has been completed). The robot control unit 17 may determine that the subtask sequence Sr has completed when a time length corresponding to the number of time steps depending on the subtask sequence Sr has elapsed after starting supplying the control signal to the robot 5 based on the subtask sequence Sr.

When it is determined that the subtask sequence Sr has been completed (step S14; Yes), the robot control unit 17 advances this robot control process to step S15. On the other hand, when it is determined that the subtask sequence Sr has not completed (step S14; No), the control of the robot 5 is continued in the step S13.

After completing the subtask sequence Sr, the operation sequence generation unit 16 respectively creates the first proposition representing the current state of the objective task and the second proposition representing the completion state of the objective task (step S15). In this case, the proposition determination unit 18 supplies the proposition request information Ic to the operation sequence generation unit 16 at a timing when the completion notification information Ib is received from the robot control unit 17, and the operation sequence generation unit 16 generates the first proposition and the second proposition when the proposition request information Ic is received from the proposition determination unit 18.

Next, the proposition determination unit 18 determines whether or not the first proposition and the second proposition generated by the operation sequence generation unit 16 match (step S16). In this case, the proposition determination unit 18 receives proposition information Id representing the first proposition and the second proposition from the operation sequence generation unit 16, and generates the determination result information Ie based on a result from comparing the first proposition and the second proposition which are indicated by the received proposition information Id.

After that, the proposition determination unit 18 determines that the objective task has normally completed when it is determined that the first proposition and the second proposition match (step S16; Yes). In this instance, the output control unit 15 notifies a task completion (step S17). In this case, for instance, the output control unit 15 performs a control for causing the task instruction device 2 to display the task view clearly indicating a normal completion of the objective task (see FIG. 8) by supplying the output control signal S2 generated based on the determination result information Ie to the task instruction device 2. Therefore, it is possible for the robot controller 1 to preferably inform the user of the completion of the objective task.

On the other hand, when it is determined that the first proposition and the second proposition do not match (step S16; No), the proposition determination unit 18 determines that the objective task has not normally completed. In this instance, the output control unit 15 outputs the alert information indicating that the task has not normally completed (step S18). In this case, for instance, the output control unit 15 performs a control for causing the task instruction device 2 to display the task view indicating the alert to that the objective task has not normally completed (see FIG. 9) by supplying the output control signal S2 generated based on the determination result information Ie to the task instruction device 2. Accordingly, it is possible for the robot controller 1 to preferably notify the user of the alert with respect to that the objective task has not normally completed.

(9) Modifications

Next, modifications of the first example embodiment will be described. The following modifications may be applied in any combination. Note that these modifications are preferably applied in a second example embodiment and a third example embodiment described later.

First Modification

Instead of causing the robot 5 to perform the objective task designated based on the user input on the task view, the robot controller 1 may cause the robot 5 to perform the objective task designated in advance.

In this case, for instance, the task designation information Ia specifying the objective task is previously stored in the storage device 4, and the operation sequence generation unit 16 acquires the task designation information Ia by referring to the storage device 4, instead of acquiring the task designation information Ia from the output control unit 15. In this manner, even in a case of executing an objective task determined in advance, it is possible for the robot controller 1 to preferably execute the objective task completion determination by comparing the first proposition with the second proposition after the execution of the subtask sequence Sr corresponding to the objective task is completed.

Second Modification

Instead of performing the control for displaying the result of the objective task completion determination on the task view or in addition to this control, the robot controller 1 may perform a control for outputting a result of the objective task completion determination by sound.

In this instance, the output control unit 15 of the robot controller 1 causes the task instruction device 2 to execute a sound output for notifying the result of the objective task completion determination by supplying the output control signal S2 including a sound output signal generated based on the determination result information Ie to the task instruction device 2. In this case, only when obtaining the determination result information Ie indicating that the objective task has not normally completed, the output control unit 15 may cause the task instruction device 2 to perform the sound output described above. In this case, the sound output may be a voice guidance for notifying that the objective task has not normally completed, or may be an alert sound.

As described above, the robot controller 1 can preferably notify the user of the task instruction device 2 of the objective task completion determination result also according to the second modification.

Third Modification

Instead of outputting the result of the objective task completion determination to the task instruction device 2 or in addition to this output, the robot controller 1 may output the result of the objective task completion determination to a management terminal that centrally manages the robot or other machines in a factory.

In this instance, after receiving the determination result information Ie from the proposition determination unit 18, the output control unit 15 of the robot controller 1 sends the determination result information Ie or the information based on the determination result information Ie, to the management terminal via the interface 13. After that, the management terminal may store information received from the robot controller 1 as historical information of the task, and may perform a display or sound output based on the received information. Note that the robot controller 1 may transmit the alert information based on the determination to the management terminal only when it is determined that the objective task has not normally completed.

Fourth Modification

The block configuration of the operation sequence generation unit 16 illustrated in FIG. 5 is an example, and various changes may be made.

For instance, information of a candidate φ of a sequence of an operation to be instructed to the robot 5 is stored in advance in the storage device 4, and the operation sequence generation unit 16 executes the optimization process of the control input generation unit 35 based on the information. Accordingly, the operation sequence generation unit 16 performs a selection of an optimal candidate φ and a determination of a control input for the robot 5. In this instance, the operation sequence generation unit 16 may not have a function corresponding to the abstract state setting unit 31, the target logical formula generation unit 32, and the time step logical formula generation unit 33 in the generation of the subtask sequence Sr. Accordingly, information concerning an execution result of a part of the functional block of the operation sequence generation unit 16 illustrated in FIG. 5 may be stored in advance in the application information storage unit 41.

In another example embodiment, the application information includes design information such as a flowchart for designing the subtask sequence Sr corresponding to the objective task in advance, and the operation sequence generation unit 16 may generate the subtask sequence Sr by referring to the design information. A specific example of executing a task based on a task sequence designed in advance is disclosed in Japanese Laid-open Patent Publication No. 2017-39170, for instance.

Second Example Embodiment

Different from the robot controller 1 of the first example embodiment, a robot controller 1 of the second example embodiment in that the objective task completion determination is performed in a case where a predetermined time length has elapsed from a start of the objective task. Hereinafter, the same components as those in the first example embodiment are appropriately denoted by the same reference numerals, and explanations thereof will be omitted.

Figure 11:
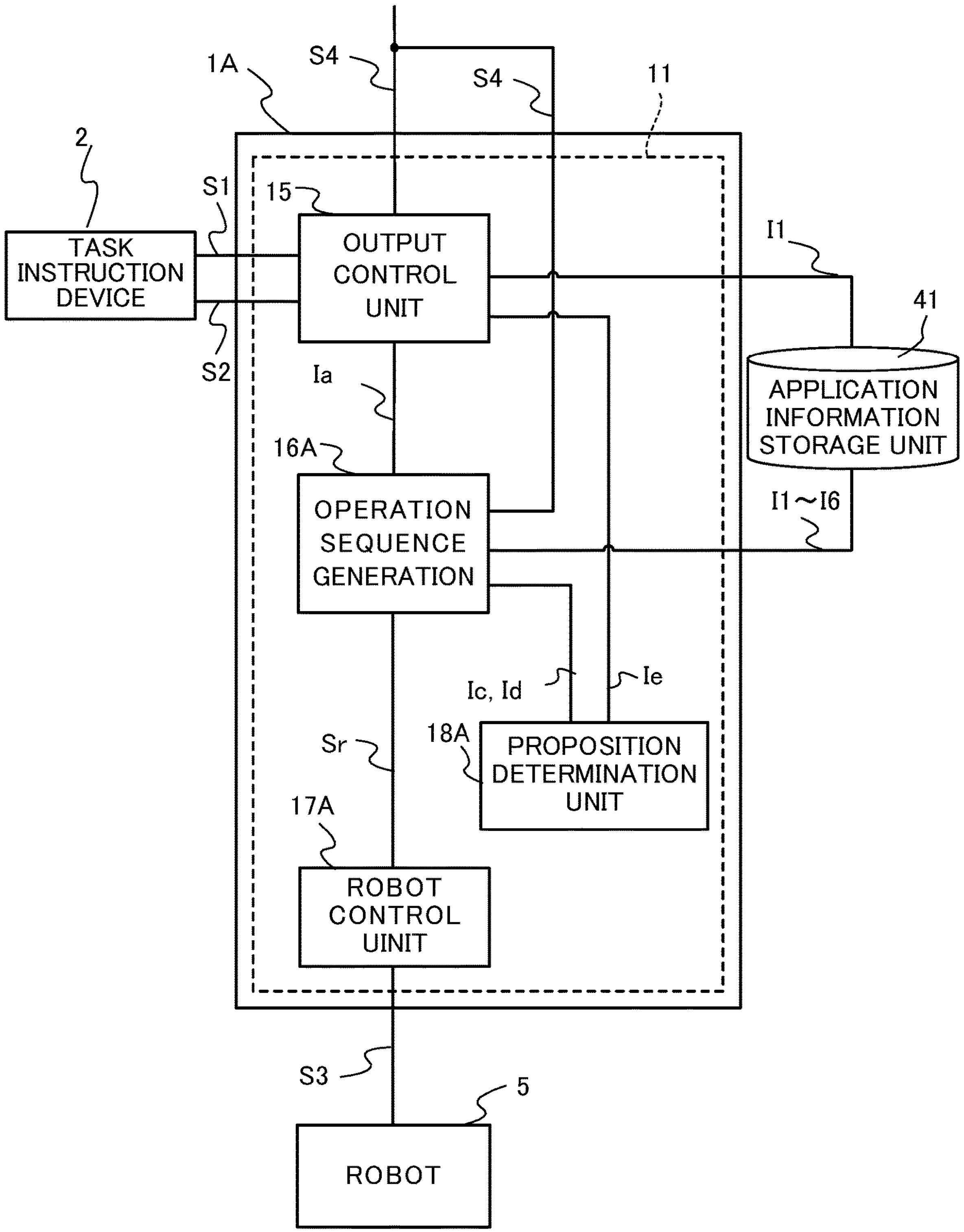
FIG. 11 is a functional block diagram of a robot controller in a second example embodiment.

FIG. 11 is a functional block diagram of a robot controller 1A in the second example embodiment. For instance, the robot controller 1A includes a hardware configuration illustrated in FIG. 2A, and the processor 11 of the robot controller 1A functionally includes an output control unit 15, an operation sequence generation unit 16A, a robot control unit 17A, and a proposition determination unit 18A.

The operation sequence generation unit 16A generates the subtask sequence Sr to be executed by the robot 5 based on the task designation information Ia supplied from the output control unit 15, the measurement signal S4, and the application information stored in the storage device 4. In this instance, the operation sequence generation unit 16A sets one or more intermediate states (also referred to as "sub-goals") until the completion state (goal) of the objective task is reached. The operation sequence generation unit 16A sequentially generates a plurality of the subtask sequences Sr necessary from the start to the completion of the objective task based on the sub-goals. In detail, the operation sequence generation unit 16A sequentially generates the subtask sequences Sr for respectively transitioning from the initial state to the sub-goal, from the sub-goal to a next sub-goal, and from the last sub-goal to the completion state (goal). In a case of receiving the proposition request information 18A from the proposition determination unit 18A, the operation sequence generation unit 16A generates the proposition information Id indicating the first proposition and the second proposition in the same manner as the operation sequence generation unit 16 of the first example embodiment, and supplies the proposition information Id to the proposition determination unit Ic.

Here, a method for setting sub-goals will be supplementally described. For instance, information necessary for setting the sub-goals is stored for each objective task in the storage device 4 in advance, and the operation sequence generation unit 16A sets the sub-goals by referring to this information. In the case of the pick-and-place, the above-described information corresponds to, for instance, information of a maximum number of moving target objects in one subtask sequence Sr.

The robot control unit 17A controls the robot 5 based on the subtask sequence Sr supplied from the operation sequence generation unit 16A. In a case where the supplied subtask sequence Sr is completed, the robot control unit 17A supplies the completion notification of the subtask sequence Sr to the operation sequence generation unit 16A.

The proposition determination unit 18A performs the objective task completion determination by comparing the first proposition with the second proposition in a case where a predetermined time has elapsed from the start of the objective task (that is, a time when a first subtask sequence Sr is supplied to the robot controller 17A). Next, similar to the first example embodiment, the proposition determination unit 18A generates the determination result information Ie based on a comparison result for the first and second propositions, and supplies the determination result information Ie to the output control unit 15.

The predetermined time length described above is set to, for instance, a time length being equal to or longer than a necessary time length of the objective task which is expected before the start of the objective task (for instance, a time length obtained by adding an upper limit time length of a time lag that may occur to the necessary time length). In this case, for instance, information necessary to calculate the above-described predetermined time length or the predetermined time length is stored for each objective task which can be set in the storage device 4 or the like, and the proposition determination unit 18A determines the above-described predetermined time length based on the information. The "information necessary to calculate the predetermined time length" corresponds to, for instance, a time length per unit of the object in a case where the necessary time length for the task depends on the number of the target objects or the like, and corresponds to a necessary time length for a work per body of the target objects 61 in the example in FIG. 6.

As described above, the proposition determination unit 18A performs the objective task completion determination in a case where a predetermined time has elapsed from the start of the objective task, and regards that the objective task has not normally completed in a case where the first proposition and the second proposition are different from each other. Accordingly, the proposition determination unit 18A can accurately determine whether or not the objective task has normally completed.

Here, in a case where a predetermined time length has elapsed from the start of the objective task, an effect of performing the objective task completion determination will be supplementally described with reference to a specific example.

For instance, in the example in FIG. 6 for picking and placing the four target objects 61 (61*a* to 61*d*) to the area G, it is assumed that a maximum of two target objects are moved in one subtask sequence Sr. In this instance, the operation sequence generation unit 16A sets the first two target objects 61*a* and 61*b* to be picked and placed to the area G as the sub-goal. Next, the operation sequence generation unit 16A first calculates the subtask sequence Sr up to the sub-goal, and supplies the calculated subtask sequence Sr to the robot controller 17. After receiving the completion notification of the subtask sequence Sr from the robot control unit 17, the operation sequence generation unit 16A sets the current abstract state based on the measurement signal S4, and recognizes that the remaining target objects 61*c* and 61*d* exist on the work table. Next, the operation sequence generation unit 16A generates the subtask sequence Sr for picking and placing the remaining target objects 61*c* and 61*d*, and supplies the subtask sequence Sr to the robot controller 17.

Here, in the example embodiments described above, it is assumed that one target object 61 is close to the obstacle 62 or falls to an area outside the operation due to some accident, and any one of the robot arms 52*a* and 52*b* is unable to grasp that target object 61. In this cases, the operation sequence generation unit 16A repeatedly generates the subtask sequence Sr so that the objective task is completed. In this case, the robot controller 17A continuously outputs the control signal S3 to the robot 5 even in a case where the necessary time length for the objective task has elapsed prior to the start of the execution of the objective task. Accordingly, in this case, in a framework of the first example embodiment in which the robot control unit 17A supplies the completion notification information Ib to the proposition determination unit 18 at a timing when the control signal S3 to the robot 5 is no longer output, the objective task completion determination by the proposition determination unit 18 is not started.

In consideration of the above, in the second example embodiment, the robot controller 1A performs the objective task completion determination when the predetermined time has lapsed since the start of the objective task. Accordingly, it is possible for the robot controller 1A to accurately determine whether the objective task has completed normally.

Figure 12:
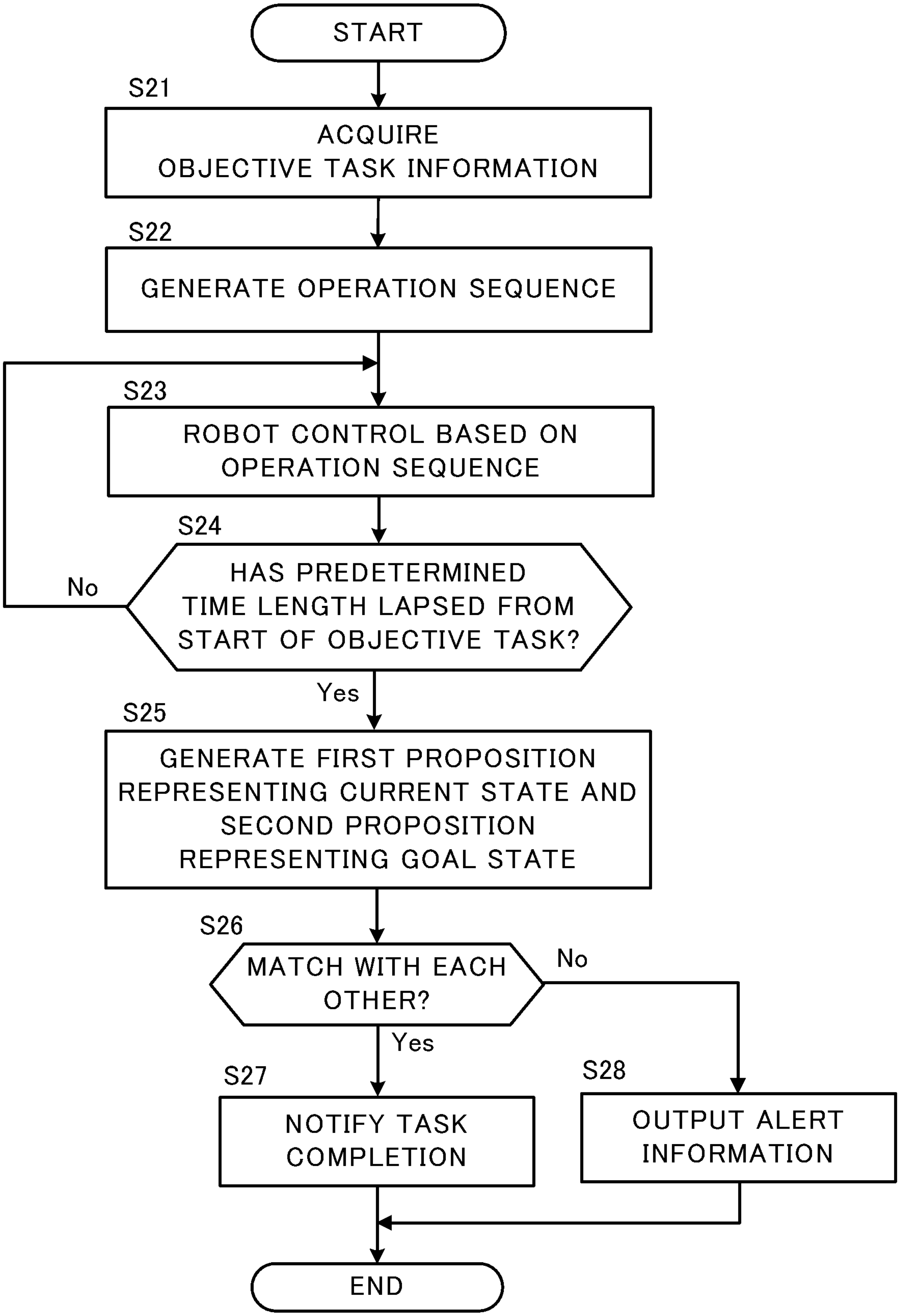
FIG. 12 is a flowchart of a robot control process which the robot controller executes in the second example embodiment.

FIG. 12 is an example of a flowchart illustrating an outline of the robot control process that is executed by the robot controller 1A in the second example embodiment.

First, the output control unit 15 of the robot controller 1 acquires the task designation information Ia (step S21). Next, the operation sequence generation unit 16A generates the subtask sequence Sr which is the operation sequence of the robot 5 based on the task designation information Ia acquired in step S21 and the measurement signal S4 (step S22). In this instance, the operation sequence generation unit 16 sets one or more sub-goals, and sequentially generates the subtask sequences Sr for respectively transitioning from the initial state to the sub-goal, from the sub-goal to the next sub-goal, and from the last subgoal to the completion state (goal). Also, the robot control unit 17A controls the robot 5 based on the subtask sequences Sr generated by the operation sequence generation unit 16A.

Next, the proposition determination unit 18A determines whether or not the predetermined time length has elapsed from the start of the objective task (step S24). Next, the predetermined time length has not elapsed from the start of the objective task (step S24; No), the operation sequence generation unit 16A and the robot controller 17A continuously perform the process concerning to step S23.

On the other hand, when the proposition determination unit 18A determines that the predetermined time length has elapsed from the start of the objective task (step S24; Yes), the operation sequence generation unit 16A generates the first proposition representing the current state of the objective task and the second proposition representing the completion state of the objective task, respectively (step S25). In this case, the proposition determination unit 18 supplies the proposition request information Ic to the operation sequence generation unit 16, and the operation sequence generation unit 16A generates the first proposition and the second proposition when the proposition request information Ic is received from the proposition determination unit 18.

Next, the proposition determination unit 18A determines whether the first proposition and the second proposition generated by the operation sequence generation unit 16A match (step S26). Then, when it is determined that the first proposition and the second proposition match (step S26; Yes), the proposition determination unit 18A determines that the objective task has normally completed. In this instance, the output control unit 15 notifies the task completion (step S27). On the other hand, the proposition determination unit 18A determines that the objective task has not normally completed when it is determined that the first proposition and the second proposition do not match (step S26; No). In this instance, the output control unit 15 outputs the alert information indicating that the task has not normally completed (step S28).

Third Example Embodiment

The third example embodiment are different from the first example embodiment and the second example embodiment in that the determination result information Ie is transmitted to an external device which manages the state of the robot 5. Hereinafter, the same components as those of the first example embodiment and the second example embodiment are appropriately denoted by the same reference numerals, and explanations thereof will be omitted.

Figure 13:
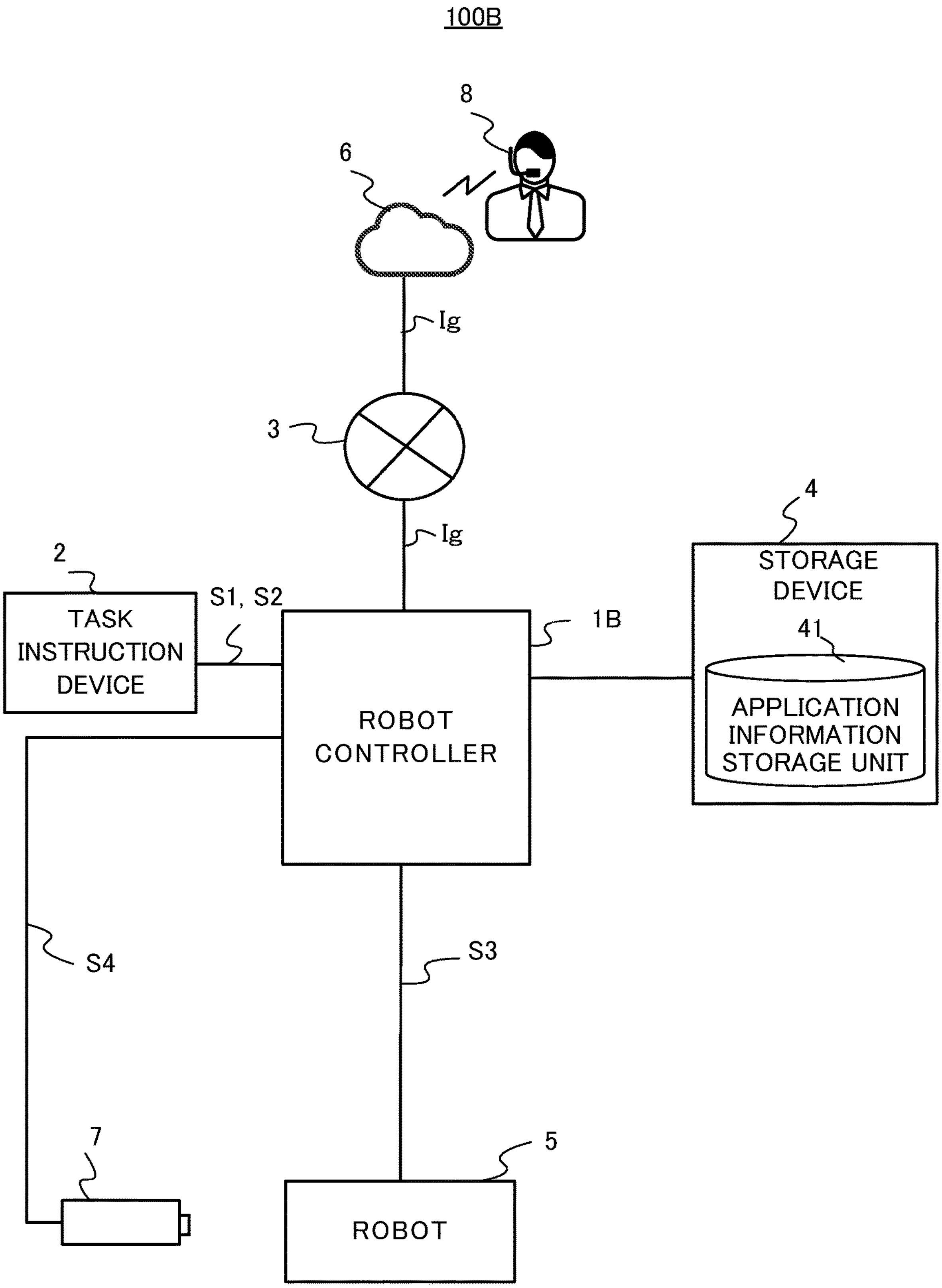
FIG. 13 is a schematic diagram of a robot control system in a third example embodiment.

FIG. 13 schematically illustrates a diagram of a robot control system 100B in the third example embodiment. The robot control system 100B mainly includes a robot controller 1B, a task instruction device 2, a storage device 4, a robot 5, a managing device 6, a measurement device 7, and a terminal 8.

The robot controller 1B performs data communications with the management device 6 which is a cloud server through a communication network 3. The robot controller 1B includes, for instance, the hardware configuration illustrated in FIG. 2 and the functional block configuration illustrated in FIG. 4 or FIG. 11. The robot controller 1B performs the same process as the robot controller 1 of the first example embodiment or the robot controller 1A of the second example embodiment, and supplies alert information "Ig" indicating that the objective task has not normally completed to the management device 6 through the communication network 3. The alert information Ig is information generated by the output control unit 15 that has received the determination result information Ie, and includes information indicating that the objective task has not normally completed, identification information of the robot 5, and date and time information indicating the date and time when the objective task has executed, and the like.

The management device 6 functions as an alert collection center for collecting the alert information Ig. The managing device 6 includes a plurality of servers and stores the alert information Ig supplied from the robot controller 1B through the communication network 3. Furthermore, the management device 6 is capable of performing the data communications with the terminal 8 used by a plurality of managers who manages the state of the robot 5 (that is, employees of a call center) by wired or wireless communications or via a communication network. The terminal 8 acquires the alert information Ig stored in the management device 6, and notifies a manager (an employee of the call center) that the objective task has not normally completed, based on the alert information Ig. In this case, the terminal 8 performs at least one of the sound output and the display to notify the manager that the objective task has not normally completed. After that, for instance, the manager makes an instruction or the like to contact a person concerned at a site where the robot 5 exists in order to eliminate a reason why the objective task has not normally completed.

According to the third example embodiment, it is possible for the robot control system 100B to preferably notify an external call center or the like that the objective task has not normally completed.

Fourth Example Embodiment

Figure 14:
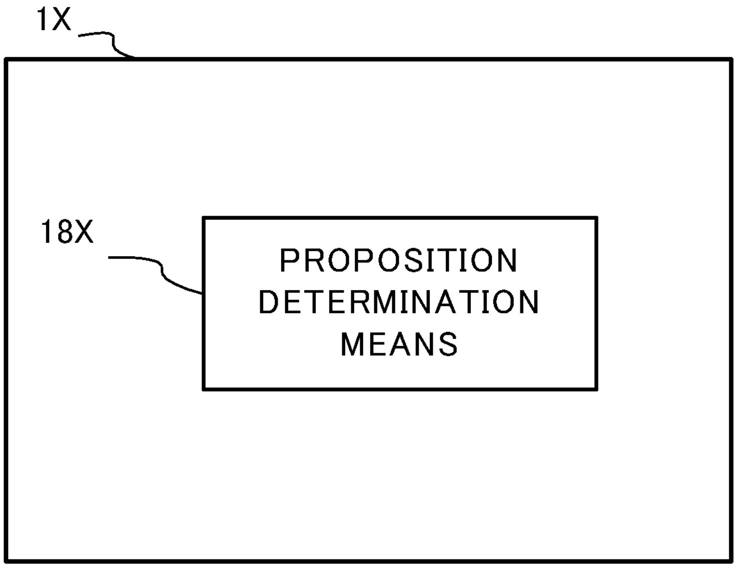
FIG. 14 is a schematic diagram of a determination device in a fourth example embodiment.

FIG. 14 is a diagram schematically illustrating a configuration of a determination device 1X in a fourth example embodiment. A determination device 1X mainly includes a proposition determination means 18X.

The determination device 1X may correspond to the robot controller 1 in the first example embodiment, the robot controller 1A in the second example embodiment, or the robot controller 1B in the third example embodiment. Moreover, the determination device 1X may be a device that performs a process corresponding to the proposition determination means 18 in a case where the robot controller 1 according to the first example embodiment is implemented by a plurality of devices. Similarly, the determination device 1X may be a device that performs a process corresponding to the proposition determination means 18 or the proposition determination means 18A in a case where the robot controller 1A in the second example embodiment or the robot controller 1B in the third example embodiment is realized by the plurality of devices. The determination device 1X may be formed by a plurality of devices.

The proposition determination means 18X determines the completion of the task based on the first proposition representing the current state of the task and the second proposition representing the completion state of the task, which are detected by a sensor when the operation sequence of the robot regarding the task is completed or when the predetermined time has elapsed from the start of the task.

Here, the "current state" refers to the state of the task detected by the sensor at a time of a process (determination process) by the determination device 1X. Here, the proposition determination means 18X may be the proposition determination means 18 in the first example embodiment (including the modifications, the same is apply hereinafter)

or the third example embodiment in a case of performing the completion determination of the task which indicates "when the operation sequence of the robot concerning the task has completed". Moreover, in a case where the completion determination of the task is performed "when the predetermined time length has elapsed since the start of the task", the proposition determination means 18A in the second example embodiment or the third example embodiment can be applied.

Figure 15:
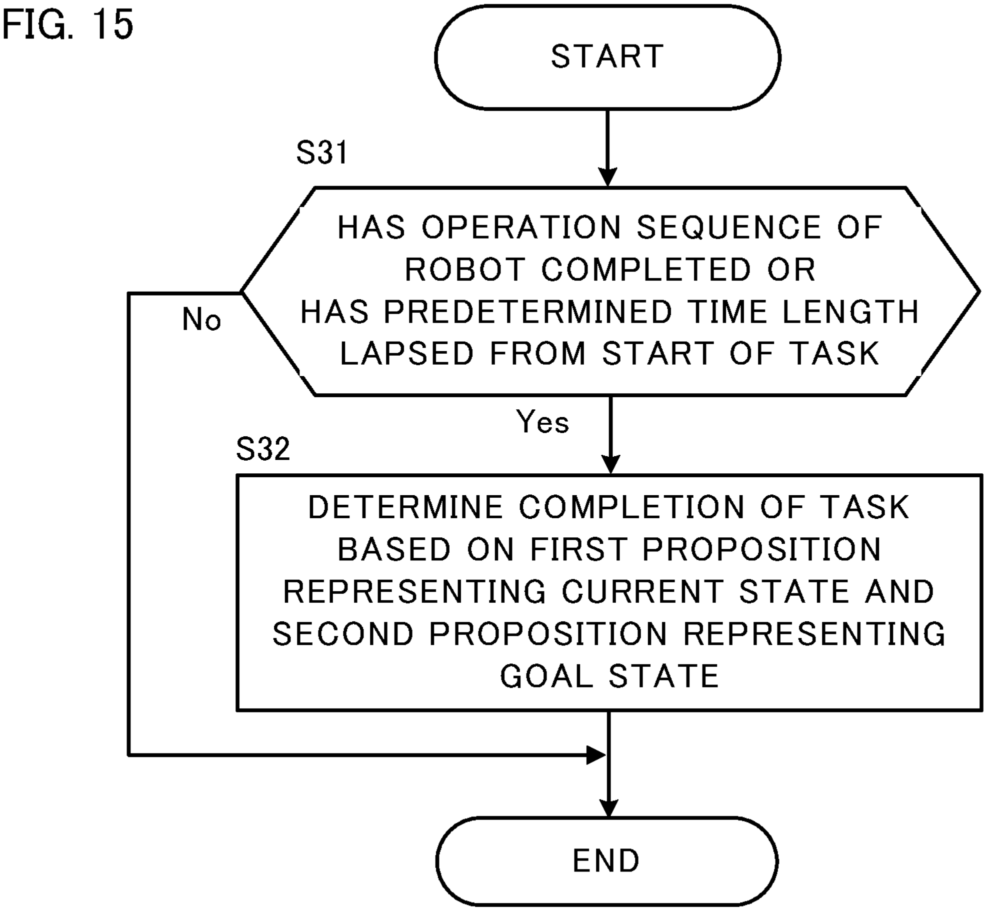
FIG. 15 is a flowchart of a process procedure to be executed by the determination device in the fourth example embodiment.

FIG. 15 is an example of a flowchart illustrating a process of executing the determination device 1X in the fourth example embodiment. The proposition determination means 18X determines whether the operation sequence of the robot concerning the task has completed or where the predetermined time length has elapsed from the start of the task (step S31). Next, when the operation sequence of the robot concerning the task has been completed, or when the predetermined time has elapsed from the start of the task (step S31; Yes), the proposition determination means 18X determines the completion of the task based on the first proposition representing the current state of the task detected by the sensor and the second proposition representing the completion state of the task (step S32). On the other hand, when the robot operation sequence concerning the task has not completed and the predetermined time length has not elapsed from the start of the task (step S31; No), the proposition determination means 18X does not execute a process of step S32.

According to the fourth example embodiment, it is possible for the determination device 1X to execute the completion determination of whether or not the task is completed accurately, by comparing the propositions representing the state of the task.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (that is, a flexible disk, a magnetic tape, a hard disk drive), a magnetic-optical storage medium (that is, a magnetic optical disk), a CD-ROM (Read Only Memory), a CD-R, a CD-R/W, a solid-state memory (that is, a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary notes.

(Supplementary Note 1)

1. A determination device comprising a proposition determination means configured to perform a completion determination of a task based on a first proposition representing a current state of the task and a second proposition representing a completion state of the task, in which the first proposition and the second proposition are detected by a sensor, when an operation sequence concerning the task has completed or when a predetermined time length has lapsed from a start of the task.

(Supplementary Note 2)

2. The determination device according to supplementary note 1, wherein the proposition determination means determines that the task has not completed when the first proposition and the second proposition are different from each other.

(Supplementary Note 3)

3. The determination device according to supplementary note 1 or 2, further comprising an output control means configured to output alert information indicating that the task has not completed, when it is determined that the task has not completed in the completion determination.

(Supplementary Note 4)

4. The determination device according to supplementary note 3, wherein the output control means sends the alert information to a management device that performs a management of a robot.

(Supplementary Note 5)

5. The determination device according to supplementary note 3, wherein the output control means performs a display or a sound output to indicate that the task has not completed, as an output of the alert information.

Note that "performing a display or a sound output" is not limited to a case where the output control means performs the display or the sound output by itself, but also includes cases where the display or the sound output is performed by transmitting a signal to another device.

(Supplementary Note 6)

6. The determination device according to any one of supplementary notes 3 to 5, wherein the output control means outputs information indicating a normal end of the task when it is determined in the completion determination that the task has completed.

(Supplementary Note 7)

7. The determination device according to any one of supplementary notes 1 to 6, further comprising an operation sequence generation means configured to generate the operation sequence based on the task.

(Supplementary Note 8)

8. The determination device according to supplementary note 7, wherein the operation sequence generation means generates the whole operation sequence necessary from the start of the task to a completion of the task, and the proposition determination means performs the completion determination of the task based on the first proposition and the second proposition when the operation sequence has completed.

(Supplementary Note 9)

9. The determination device according to supplementary note 8, further comprising a robot control means configured to control the robot based on the operation sequence, wherein the proposition determination means determines that the operation sequence has completed, when the robot control means completes an output of the control signal to the robot.

(Supplementary Note 10)

10. The determination device according to supplementary note 7, wherein the operation sequence generation means sequentially generates a plurality of the operation sequences necessary from a start of the task to a completion of the task, based on one or more intermediate states until the completion of the task, and the proposition determination means performs the completion determination of the task based on the first proposition and the second proposition, when the predetermined time length has lapsed from the start of the task.

(Supplementary Note 11)

11. The determination device according to any one of supplementary notes 7 to 10, wherein the operation sequence generation means includes a logical formula conversion means configured to convert the task into a logical formula based on a temporal logic;

a time step logical formula generation means configured to generate, from the logical formula, a time step logical formula which is a logical formula representing a state for each of time steps for executing the task; and a subtask sequence generation means configured to generate a sequence of subtasks to be executed by the robot based on the time step logical formula.

(Supplementary Note 12)

12. The determination device according to supplementary note 11, wherein the operation sequence generation means further includes an abstract state setting means configured to set an abstract state abstractly representing a state of an object concerning the task, as a proposition to be used in the logical formula.

(Supplementary Note 13)

13. The determination device according to any one of supplementary notes 1 to 12, wherein the predetermined time length is set as a time length equal to or longer than a necessary time length for the task.

(Supplementary Note 14)

14. A determination method performed by a computer, the determination method comprising:

performing a completion determination of a task based on a first proposition representing a current state of the task and a second proposition representing a completion state of the task, in which the first proposition and the second proposition are detected by a sensor, when an operation sequence concerning the task has completed or when a predetermined time length has lapsed from a start of the task.

(Supplementary Note 15)

15. A recording medium storing a program, the program causing a computer to perform a process comprising:

performing a completion determination of a task based on a first proposition representing a current state of the task and a second proposition representing a completion state of the task, in which the first proposition and the second proposition are detected by a sensor, when an operation sequence concerning the task has completed or when a predetermined time length has lapsed from a start of the task.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF SYMBOLS

1, 1A, 1B Robot controller
1X Determination device
2 Task indicating device
3 Communication network
4 Storage device
5 Robot
6 Management device
7 Measurement device
41 Application information storage unit
100, 100B Robot control system

The invention claimed is:

1. A determination device comprising a memory storing instructions; and one or more processors configured to execute the instructions to:

perform a completion determination of an objective task by a robot based on a first proposition representing a current state of the objective task and a second proposition representing a completion state of the objective task, wherein the first proposition and the second proposition are different, in a case where an operation sequence concerning the objective task has completed or in a case a predetermined time length has lapsed from a start of the objective task, wherein the robot includes at least one arm, and the objective task is achieved by subtask sequence and completed by the robot handling one or more target objects in a workplace, and the one or more processors recognize a position of the at least one arm and a position of each object based on a recognition result concerning each object which is acquired from a measurement device that detects a state in a workspace, generate the first proposition that-represents the current state of each object necessary for the completion determination of the objective task based on the recognition result, generate the second proposition that represents the completion state of each object necessary for the completion determination of the objective task, and generate the operation sequence using two or more functions each of defining an operation of a hand at an end of the at least one arm.

2. The determination device according to claim 1, wherein the one or more processors determine that the objective task has not completed in a case where the first proposition and the second proposition are different from each other.

3. The determination device according to claim 1, wherein the one or more processors are further configured to output alert information indicating that the objective task has not completed, in a case where it is determined that the objective task has not completed in the completion determination.

4. The determination device according to claim 3, wherein the one or more processors send the alert information to a management device that performs a management of the robot.

5. The determination device according to claim 3, wherein the one or more processors perform a display or a sound output to indicate that the objective task has not completed, as an output of the alert information.

6. The determination device according to claim 3, wherein the one or more processors output information indicating a normal end of the objective task in a case where it is determined in the completion determination that the objective task has completed.

7. The determination device according to claim 1, wherein the one or more processors are further configured to generate the operation sequence based on the objective task.

8. The determination device according to claim 7, wherein
- the one or more processors generate the operation sequence necessary from the start of the objective task to a completion of the objective task in entirety, and
- the one or more processors perform the completion determination of the objective task based on the first proposition and the second proposition in a case where the operation sequence has completed.

9. The determination device according to claim 8, wherein the one or more processors are further configured to control the robot based on the operation sequence,
- wherein the one or more processors determine that the operation sequence has completed, in a case where the one or more processors complete an output of a control signal to the robot.

10. The determination device according to claim 7, wherein
- the one or more processors sequentially generate a plurality of the operation sequences necessary from a start of the objective task to a completion of the objective task, based on one or more intermediate states until the completion of the objective task, and
- the one or more processors perform the completion determination of the objective task based on the first proposition and the second proposition, in a case where the predetermined time length has lapsed from the start of the objective task.

11. The determination device according to claim 7, wherein the one or more processors are further configured to
- convert the objective task into a logical formula based on a temporal logic;
- generate, from the logical formula, a time step logical formula which is a logical formula representing a state for each of time steps for executing the objective task; and
- generate a sequence of subtasks to be executed by the robot based on the time step logical formula.

12. The determination device according to claim 11, wherein the one or more processors are further configured to
- set a state representing a state of the one or more objects concerning the objective task, as a proposition to be used in the logical formula.

13. The determination device according to claim 1, wherein the predetermined time length is set as a time length equal to or longer than a necessary time length for the objective task.

14. A determination method performed by a computer and comprising:
- performing a completion determination of an objective task by a robot based on a first proposition representing a current state of the objective task and a second proposition representing a completion state of the objective task, wherein the first proposition and the second proposition are different,
  - in a case where an operation sequence concerning the objective task has completed or in a case a predetermined time length has lapsed from a start of the objective task, wherein
- the robot includes at least one arm, and
- the objective task is achieved by subtask sequence and completed by the robot handling one or more target objects in a workplace;
- recognizing a position of the at least one arm and a position of each object based on a recognition result concerning each object which is acquired from a measurement device that detects a state in a workspace;
- generating the first proposition that-represents the current state of each object necessary for the completion determination of the objective task based on the recognition result,
- generate the second proposition that represents the completion state of each object necessary for the completion determination of the objective task, and
- generating the operation sequence using two or more functions each of defining an operation of a hand at an end of the at least one arm.

15. A non-transitory computer-readable recording medium storing a program executable by a computer to perform processing comprising:
- performing a completion determination of an objective task by a robot based on a first proposition representing a current state of the objective task and a second proposition representing a completion state of the objective task, wherein the first proposition and the second proposition are different,
  - in a case where an operation sequence concerning the objective task has completed or in a case a predetermined time length has lapsed from a start of the objective task, wherein
- the robot includes at least one arm, and
- the objective task is achieved by subtask sequence and completed by the robot handling one or more target objects in a workplace;
- recognizing a position of the at least one arm and a position of each object based on a recognition result concerning each object which is acquired from a measurement device that detects a state in a workspace;
- generating the first proposition that-represents the current state of each object necessary for the completion determination of the objective task based on the recognition result,
- generating the second proposition that represents the completion state of each object necessary for the completion determination of the objective task, and
- generating the operation sequence using two or more functions each of defining an operation of a hand at an end of the at least one arm.

* * * * *